(12) United States Patent
Singer

(10) Patent No.: US 10,449,893 B1
(45) Date of Patent: Oct. 22, 2019

(54) BRAKE LIGHT FOR TRUCK BED ENCLOSURE

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 16/125,334

(22) Filed: Sep. 7, 2018

(51) Int. Cl.
*B60Q 1/44* (2006.01)
*B60J 7/12* (2006.01)
*B60Q 1/30* (2006.01)

(52) U.S. Cl.
CPC .............. *B60Q 1/44* (2013.01); *B60J 7/1226* (2013.01); *B60J 7/1291* (2013.01); *B60Q 1/30* (2013.01)

(58) Field of Classification Search
CPC .............. B60R 9/00; B60R 11/06; B60Q 3/30
USPC ........ 340/479, 432, 468, 469, 471; 362/487, 362/496, 541
See application file for complete search history.

(56) References Cited

U.S. PATENT DOCUMENTS

| | | | | |
|---|---|---|---|---|
| 4,896,136 A | * | 1/1990 | Hotovy | B60Q 1/302 340/468 |
| 5,040,099 A | * | 8/1991 | Harris | A42B 3/0453 362/105 |
| 6,686,837 B2 | * | 2/2004 | Kim | A42B 3/0453 340/432 |
| 7,182,386 B2 | * | 2/2007 | Damian | B60Q 1/302 296/100.02 |
| 9,499,106 B2 | * | 11/2016 | Reed, III | B60R 11/06 |
| 2016/0362070 A1 | * | 12/2016 | Reed, III | B60R 11/06 |

* cited by examiner

*Primary Examiner* — Tai T Nguyen
(74) *Attorney, Agent, or Firm* — Klein, O'Neill & Singh, LLP

(57) ABSTRACT

An auxiliary third brake light which is installed on a removable or collapsible truck bed enclosure or frame is disclosed. The auxiliary third brake light is preferably not physically secured by adhesive or mechanical fastener to the truck bed, cab or body or any part of the truck. Rather, the parts of the auxiliary third brake light that are mounted to the truck bed cover and contact the truck bed, cab or body is pressed into contact. In this way, when the truck bed cover is collapsed or removed, the user can have full use of the truck bed. The parts of the auxiliary third brake light that contact the truck bed, cab or body are pulled off therefrom. When the truck bed cover is deployed to the erected position or put back on the truck bed, the parts of the third brake light that contact the truck bed, cab or body are properly repositioned back into position.

11 Claims, 24 Drawing Sheets

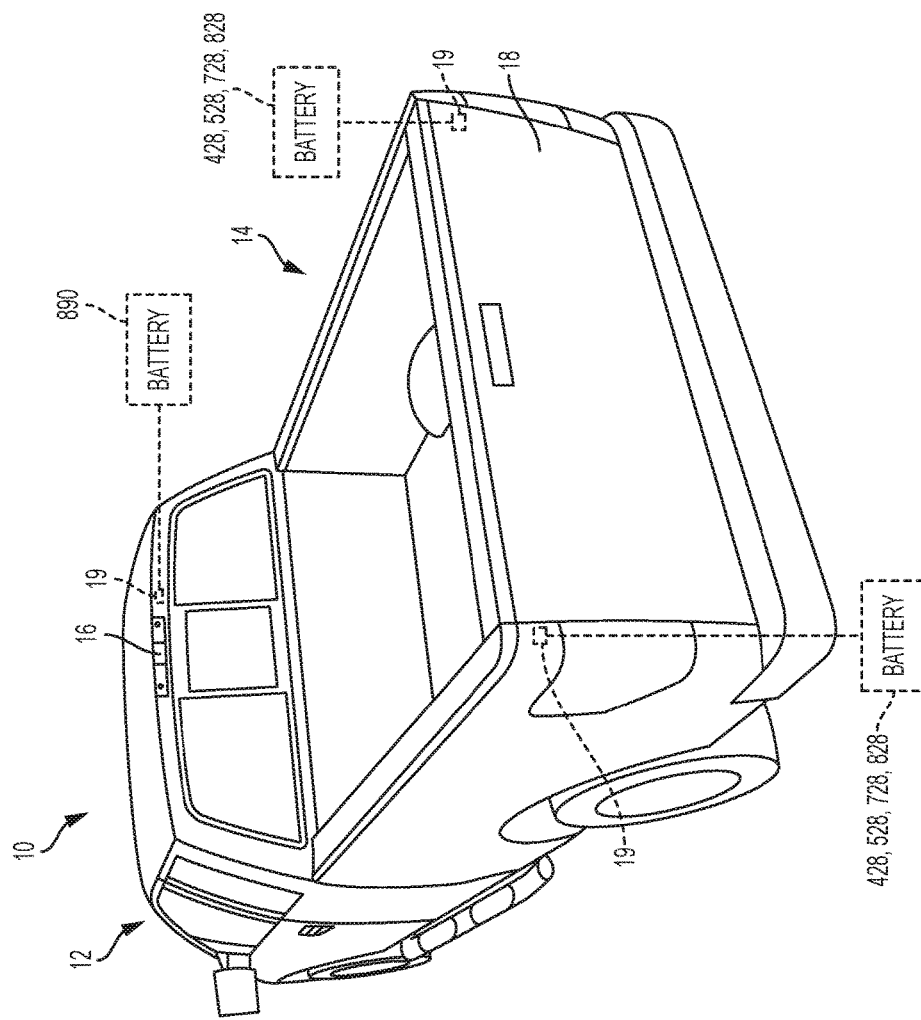

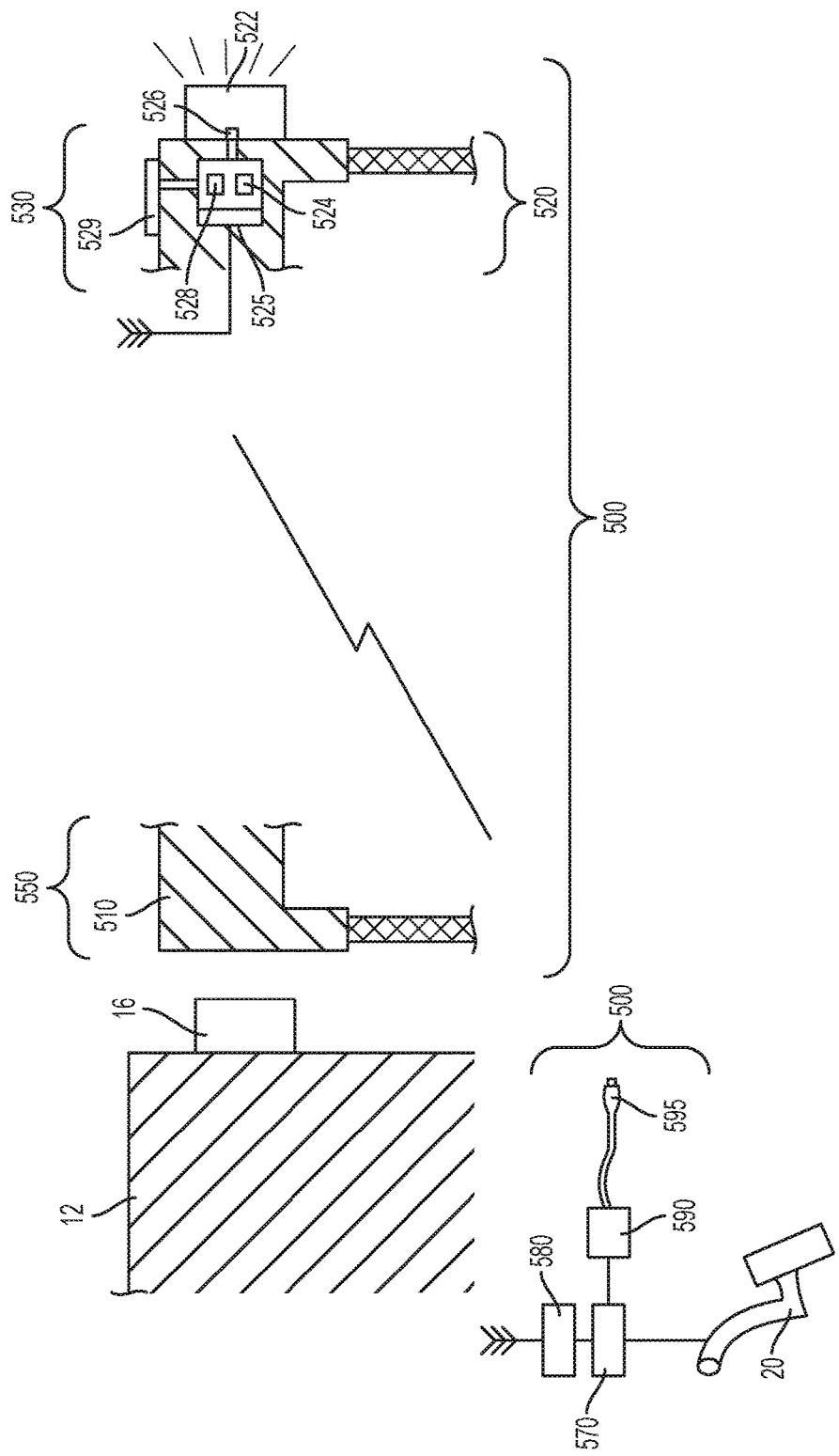

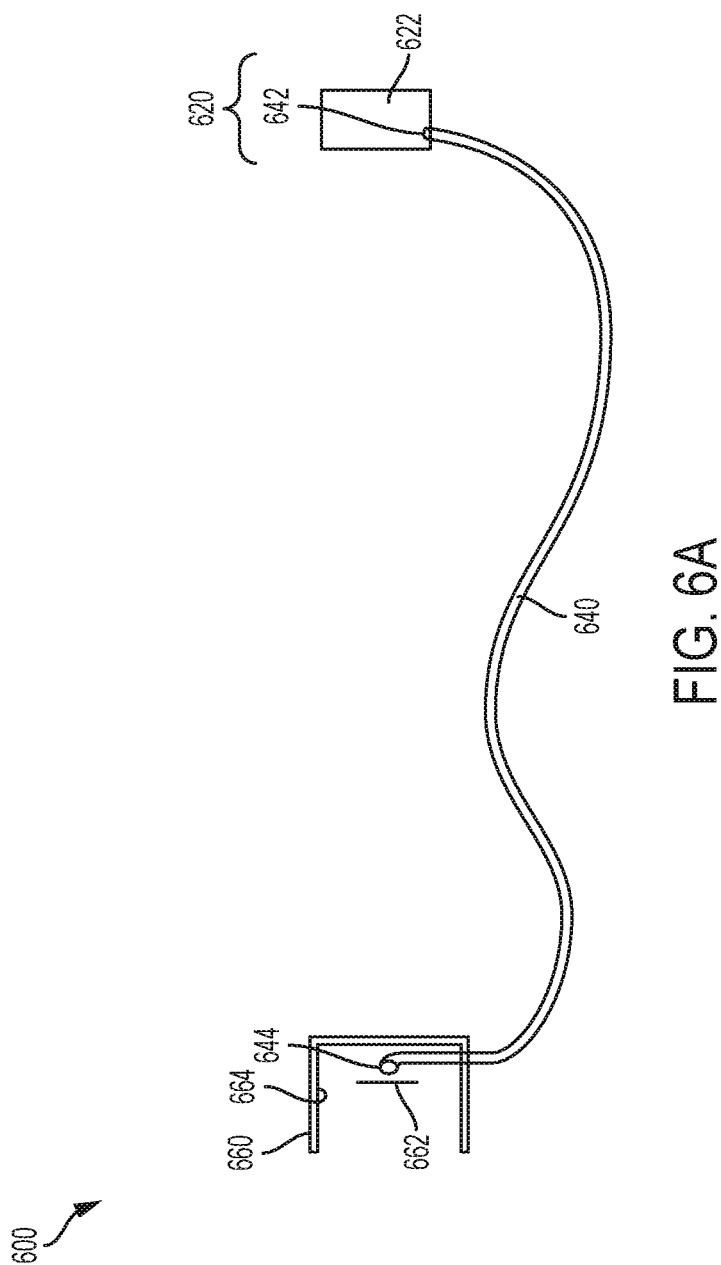

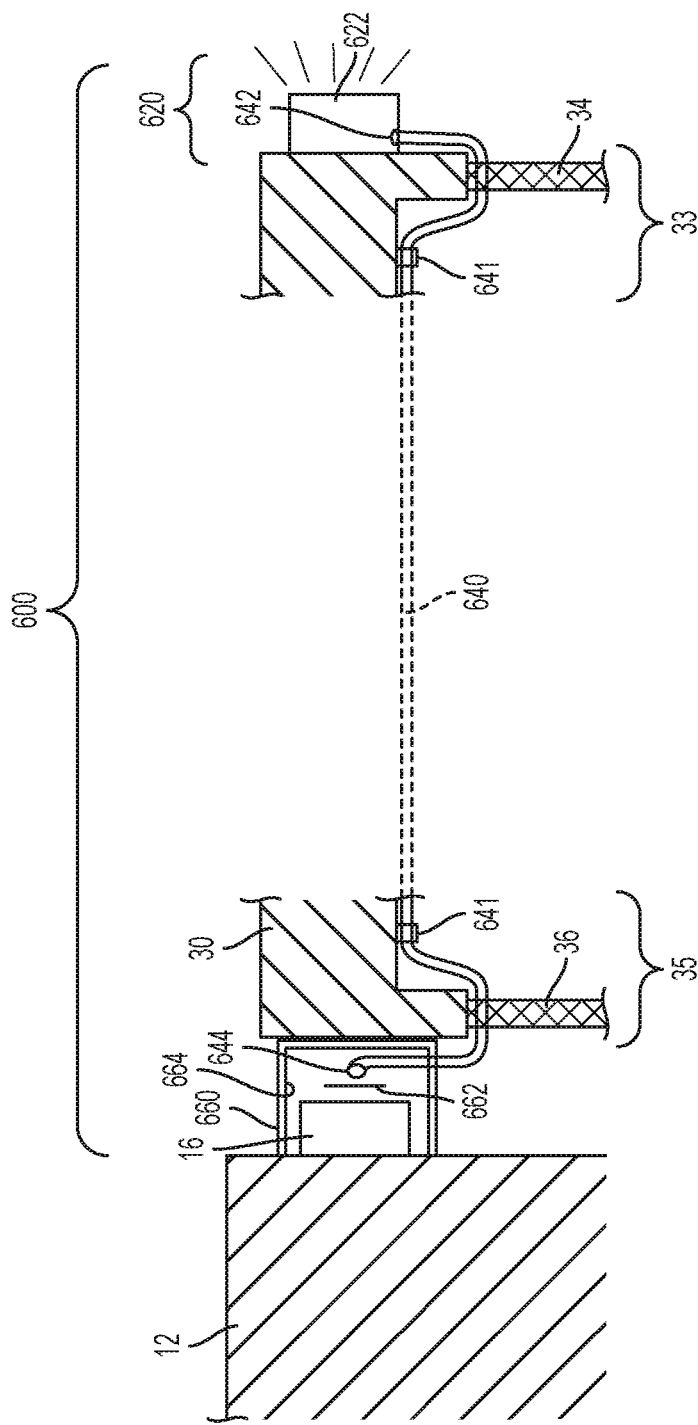

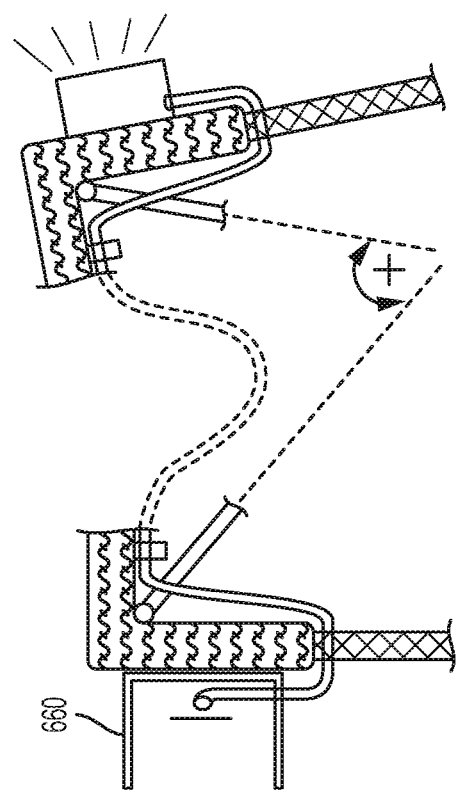
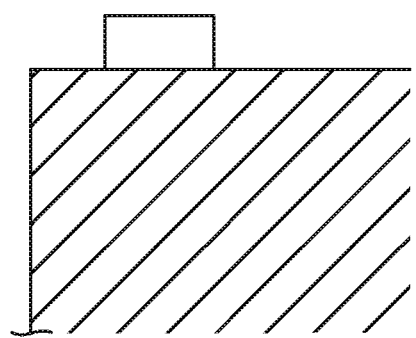
FIG. 6Cii

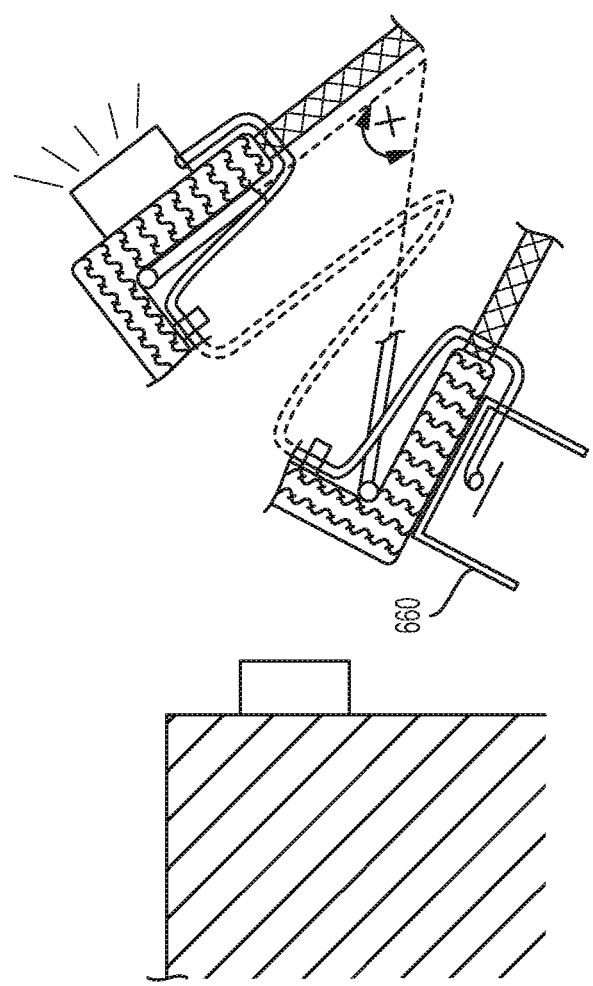
FIG. 6Ciii

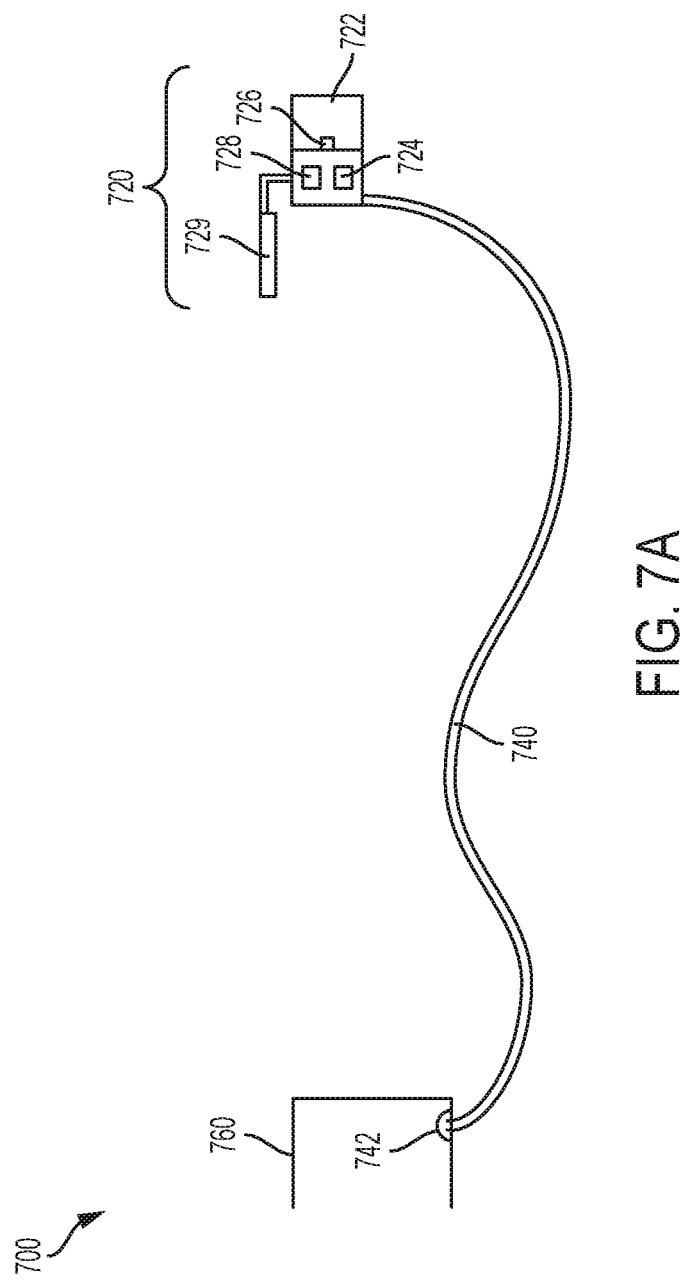

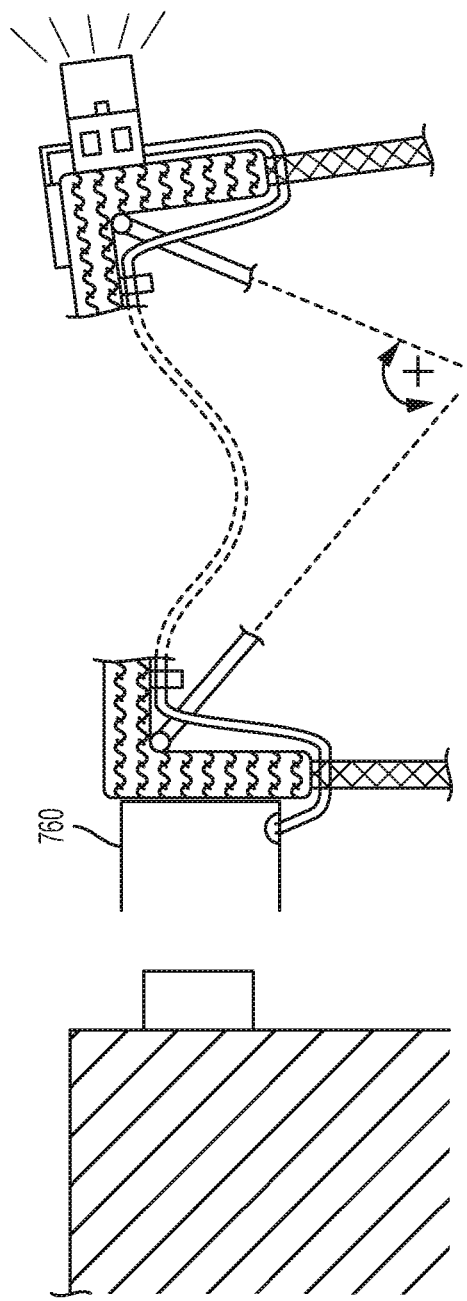
FIG. 7Cii

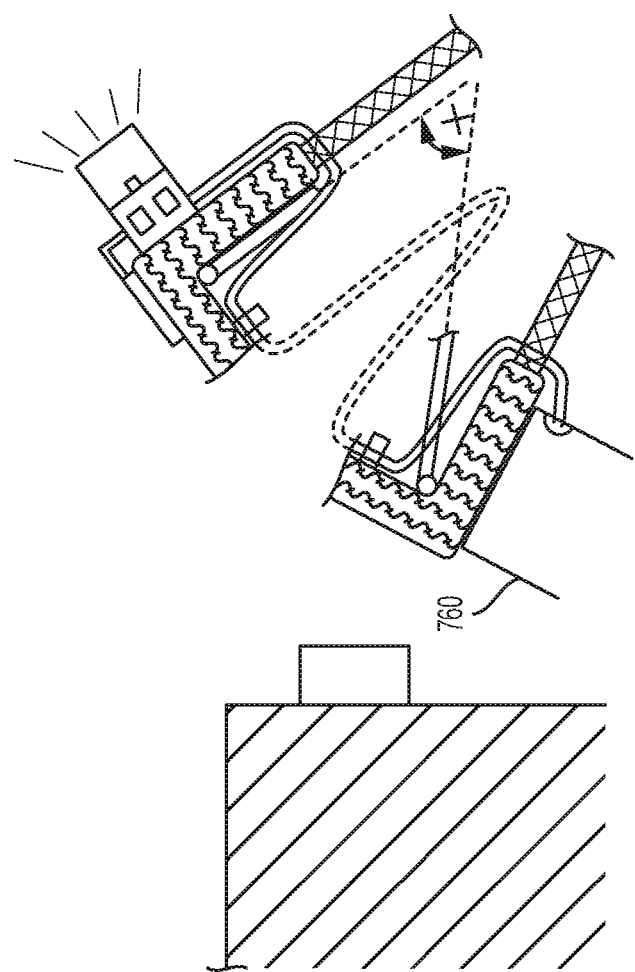
FIG. 7Ciii

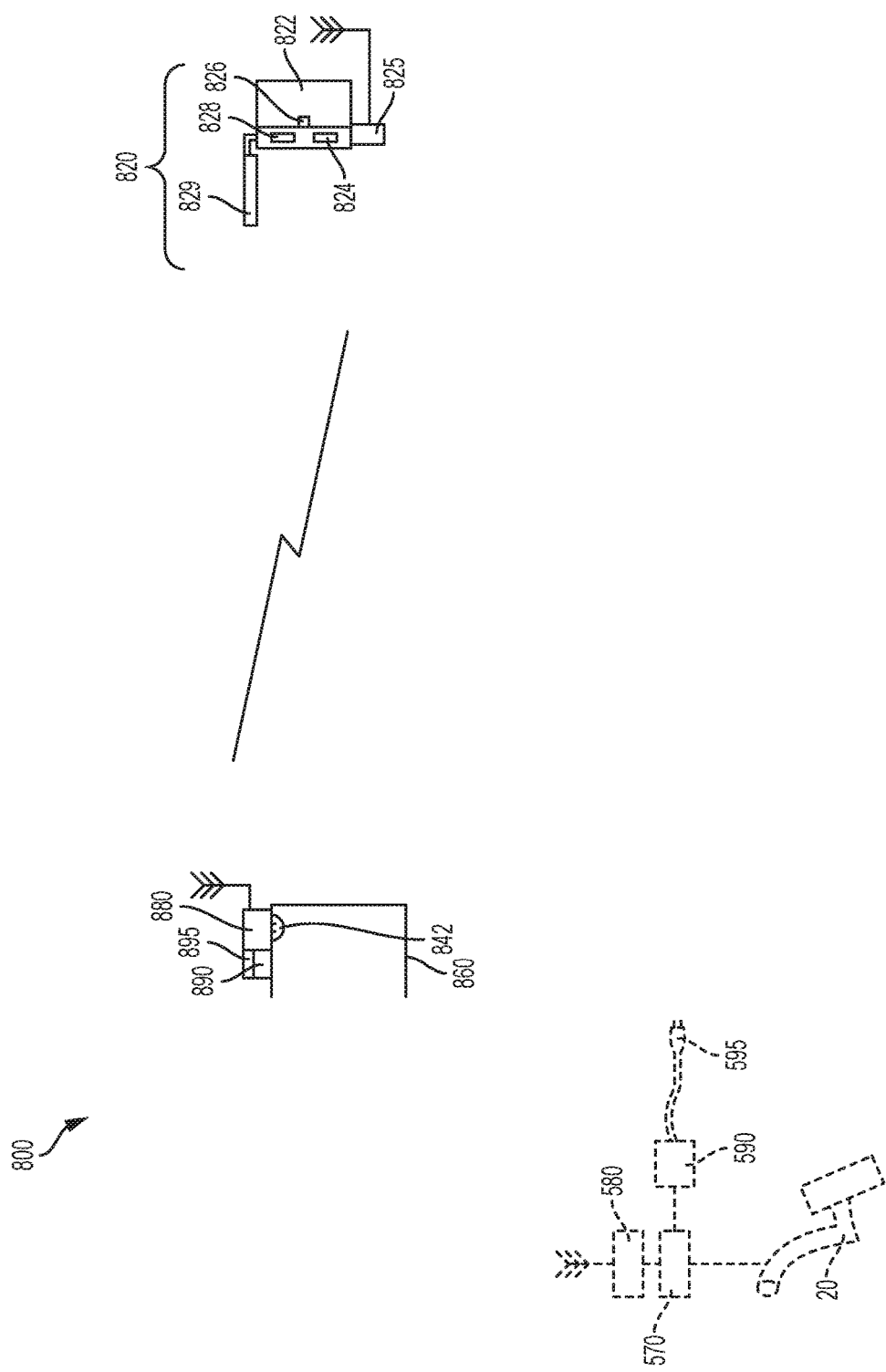

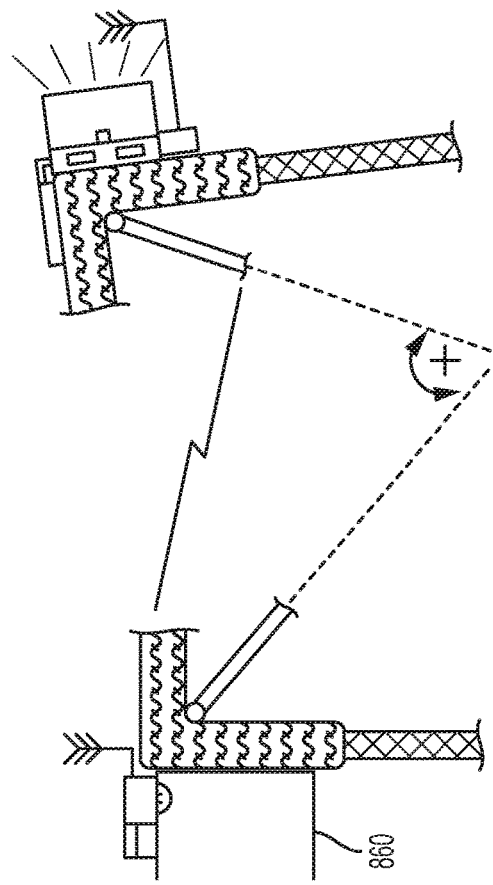
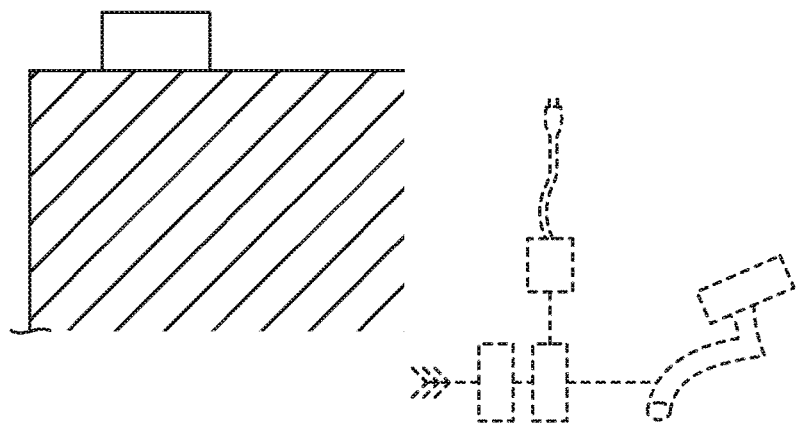
FIG. 8Cii

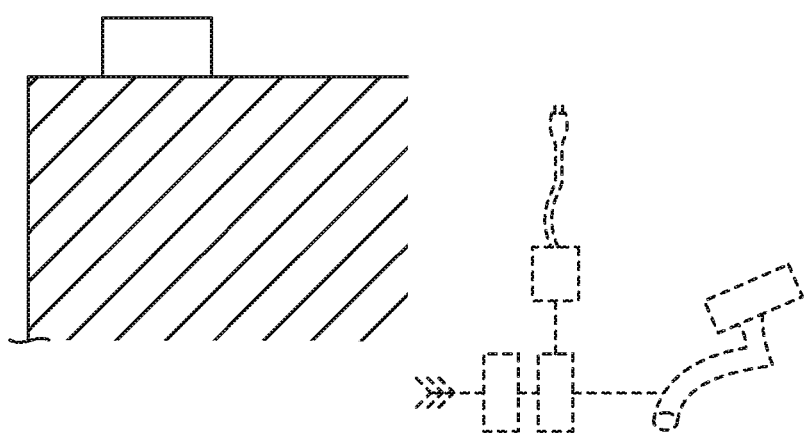
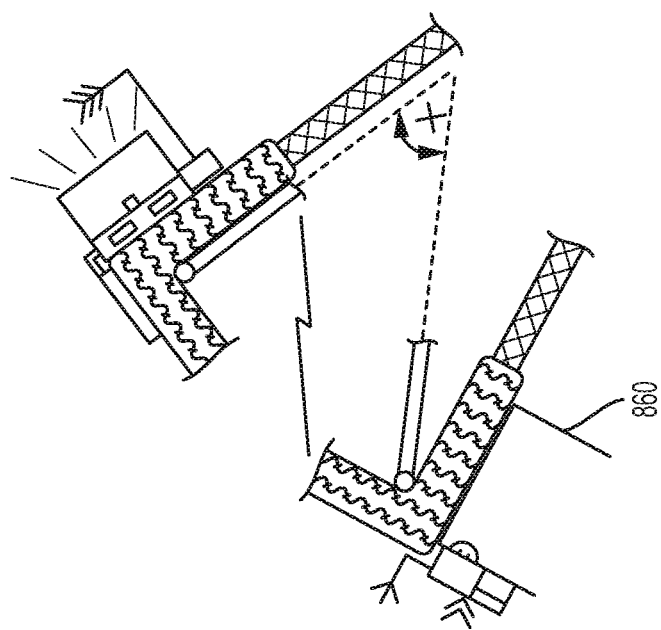
FIG. 8Ciii

BRAKE LIGHT FOR TRUCK BED ENCLOSURE

CROSS-REFERENCE TO RELATED APPLICATIONS

Not Applicable

STATEMENT RE: FEDERALLY SPONSORED RESEARCH/DEVELOPMENT

Not Applicable

BACKGROUND

When using a camper shell, the center high mount stop lamp (also called the "third brake light") of a truck may be blocked and not visible. In order to comply with motor vehicle laws, an additional third brake light may be installed on the rear of the camper shell and electrically connected to the vehicle's existing lighting system. However, problems arise when doing so.

BRIEF SUMMARY

The present disclosure contemplates various systems and devices for overcoming drawbacks accompanying the related art. An auxiliary third brake light can be installed without needing to interfere with the existing wiring of a truck's lighting system. Because the auxiliary third brake light does not interfere with the existing wiring of the truck's lighting system, the camper shell can be easily removed from the truck bed or mounted back to the truck bed when desired. The auxiliary third brake light may be used with a truck bed accessory such as a camper shell that blocks the Original Equipment Manufacturer (OEM) third brake light of the truck. In this way, a person may comply with motor vehicle laws requiring a visible third brake light while avoiding the hassle of tapping into the electrical wiring of the truck, which may be inconvenient to access. In some contemplated embodiments (e.g. FIGS. 1B-1D, 3, and 6A-6C), light from an OEM third brake light is collected and transmitted by an optical waveguide to a light fixture of the auxiliary third brake light. In this way, the optical waveguide may serve as both a signal line and a power source for the auxiliary third brake light. In other embodiments (e.g. FIGS. 4 and 7A-7C), light from the OEM third brake light is received by an optical sensor and used to signal the illumination of the auxiliary third brake light, with the auxiliary third brake light having a separate power source. The optical sensor may be near the auxiliary third brake light, in which case the light from the OEM third brake light may be transmitted to the optical sensor by an optical waveguide. Alternatively, the optical sensor may be near the OEM third brake light and an electrical wire may be used to transmit a signal from the optical sensor to the auxiliary third brake light. In still other embodiments (e.g. FIGS. 5 and 8A-8C), the auxiliary third brake light may illuminate in response to a wireless signal. The wireless signal may be transmitted in response to a position sensor in the cab of the truck sensing a depressed position of a brake pedal. The auxiliary third brake light may be integrated with the body of the truck bed accessory (e.g. FIGS. 1B-1D and 3-5) or may be retrofitted to an existing truck bed accessory (e.g. FIGS. 2A-2C, 6A-6C, 7A-7C, and 8A-8C).

One aspect of the embodiments of the present disclosure is a camper shell for a truck. the camper shell includes a shell body that fits over a bed of the truck and blocks an OEM third brake light located on a cab of the truck, the shell body having a front portion adjacent to the cab of the truck and a rear portion adjacent to a tailgate of the truck, an optical or electric signal line extending from the front portion to the rear portion of the shell body, the signal line arranged to transmit a signal in response to illumination of the OEM third brake light, and an auxiliary third brake light disposed at the rear portion of the shell body and connected to the signal line, the auxiliary third brake light configured to illuminate in response to receiving the signal transmitted by the signal line.

The signal line may be an optical waveguide and the signal transmitted by the signal line may be an optical signal. The auxiliary third brake light may include an optical sensor arranged to receive the optical signal transmitted by the optical waveguide and the auxiliary third brake light may be configured to illuminate in response to the optical sensor receiving the optical signal. The auxiliary third brake light may include a light fixture arranged to receive light from the OEM third brake light via the optical waveguide. The camper shell may include a lens disposed at the front portion of the shell body and arranged to focus light from the OEM third brake light into the optical waveguide. The camper shell may include a recess formed at the front portion of the shell body with the lens disposed therein, the recess including one or more reflective surfaces arranged to collect light from the OEM third brake light and direct the collected light toward the lens.

The signal line may be an electrical wire and the camper shell may include an optical sensor connected to the electrical wire and disposed at the front portion of the shell body to receive light from the OEM third brake light.

The camper shell may include a battery configured to provide power to the auxiliary third brake light. The camper shell may include a photovoltaic cell disposed on the shell body and configured to charge the battery.

The shell body may include a collapsible frame and a flexible fabric disposed on the frame.

Another aspect of the embodiments of the present disclosure is a camper shell system for a truck. The camper shell system includes a shell body that fits over a bed of the truck and blocks an OEM third brake light located on a cab of the truck, the shell body having a front portion adjacent to the cab of the truck and a rear portion adjacent to a tailgate of the truck, a position sensor arranged to sense a depressed position of a brake pedal of the truck, a wireless transmitter connected to the position sensor and configured to transmit a wireless signal in response to the position sensor sensing a depressed position of the brake pedal, a wireless receiver configured to receive the wireless signal transmitted by the wireless transmitter, and an auxiliary third brake light disposed at the rear portion of the shell body and connected to the wireless receiver, the auxiliary third brake light configured to illuminate in response to the wireless receiver receiving the wireless signal transmitted by the wireless transmitter.

The camper shell system may include a brake light battery configured to provide power to the auxiliary third brake light and the wireless receiver. The camper shell system may include a photovoltaic cell configured to charge the brake light battery.

The camper shell system may include a position sensor battery configured to provide power to the position sensor and the wireless transmitter. The camper shell system may include a charger configured to charge the position sensor battery by plugging into a charging outlet located in the cab of the truck.

The position sensor may include an optical sensor.

The shell body may include a collapsible frame and a flexible fabric disposed on the frame.

Another aspect of the embodiments of the present disclosure is a brake light system for a camper shell that fits over a bed of a truck and blocks an OEM third brake light located on a cab of the truck, the camper shell having a front portion adjacent to the cab of the truck and a rear portion adjacent to a tailgate of the truck. The brake light system includes an electrical wire extending five feet or more from a first end to a second end, an optical sensor connected to the electrical wire at the first end, the optical sensor disposable at the front portion of the shell body to receive light from the OEM third brake light, and an auxiliary third brake light connected to the electrical wire at the second end and configured to illuminate in response to a signal on the electrical wire, the auxiliary third brake light disposable at the rear portion of the shell body.

The brake light system may include a battery configured to provide power to the auxiliary third brake light. The brake light system may include a photovoltaic cell configured to charge the battery.

Another aspect of the embodiments of the present disclosure is a brake light system for a camper shell that fits over a bed of a truck and blocks an OEM third brake light located on a cab of the truck, the camper shell having a front portion adjacent to the cab of the truck and a rear portion adjacent to a tailgate of the truck. The brake light system includes an optical waveguide extending five feet or more from a first end to a second end, a light collecting cup connected to the optical waveguide at the first end and disposable at the front portion of the shell body, the light collecting cup sized to fit over the OEM third brake light and prevent outside light from entering the optical waveguide, and an auxiliary third brake light connected to the optical waveguide at the second end and configured to illuminate in response to a signal on the optical waveguide, the auxiliary third brake light disposable at the rear portion of the shell body.

Another aspect of the embodiments of the present disclosure is a brake light system for a camper shell that fits over a bed of a truck and blocks an OEM third brake light located on a cab of the truck, the camper shell having a front portion adjacent to the cab of the truck and a rear portion adjacent to a tailgate of the truck. The brake light system includes a position sensor disposable so as to sense a depressed position of a brake pedal of the truck, a wireless transmitter connected to the position sensor and configured to transmit a wireless signal in response to the position sensor sensing a depressed position of the brake pedal, a wireless receiver configured to receive the wireless signal transmitted by the wireless transmitter, and an auxiliary third brake light disposable at the rear portion of the camper shell and connected to the wireless receiver, the auxiliary third brake light configured to illuminate in response to the wireless receiver receiving the wireless signal transmitted by the wireless transmitter.

Another aspect of the embodiments of the present disclosure is a brake light system for a camper shell that fits over a bed of a truck and blocks an OEM third brake light located on a cab of the truck, the camper shell having a front portion adjacent to the cab of the truck and a rear portion adjacent to a tailgate of the truck. The brake light system includes an optical sensor disposable at the front portion of the camper shell to receive light from the OEM third brake light, a wireless transmitter connected to the optical sensor and configured to transmit a wireless signal in response to the optical sensor sensing light from the OEM third brake light, a wireless receiver configured to receive the wireless signal transmitted by the wireless transmitter, and an auxiliary third brake light disposable at the rear portion of the camper shell and connected to the wireless receiver, the auxiliary third brake light configured to illuminate in response to the wireless receiver receiving the wireless signal transmitted by the wireless transmitter.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1A is a perspective view of a truck having an exposed Original Equipment Manufacturer (OEM) brake light;

FIG. 5 is a schematic view of a camper shell system according to another embodiment of the present disclosure, including a cross sectional view of an auxiliary brake light of the camper shell system;

FIG. 6A is a cross sectional view of a brake light system according to another embodiment of the present disclosure;

FIG. 6B is a cross sectional view of a camper shell together with the brake light system of FIG. 6A;

FIG. 6Cii illustrates the shell shown in FIG. 6Ci as a light collecting cup is pulled away from the OEM third brake light;

FIG. 6Ciii illustrates the shell shown in FIG. 6Cii as the shell is being collapsed;

FIG. 7A is a cross sectional view of a brake light system according to another embodiment of the present disclosure;

FIG. 7Cii illustrates the shell shown in FIG. 7Ci as a light collecting cup is pulled away from the OEM third brake light;

FIG. 7Ciii illustrates the shell shown in FIG. 7Cii as the shell is being collapsed;

FIG. 8A is a schematic view of a brake light system according to another embodiment of the present disclosure, including a cross sectional view of an auxiliary brake light of the brake light system;

FIG. 8Cii illustrates the shell shown in FIG. 8Ci as a light collecting cup is pulled away from the OEM third brake light; and FIG. 8Ciii illustrates the shell shown in FIG. 8Cii as the shell is being collapsed.

DETAILED DESCRIPTION

Figure 1B:
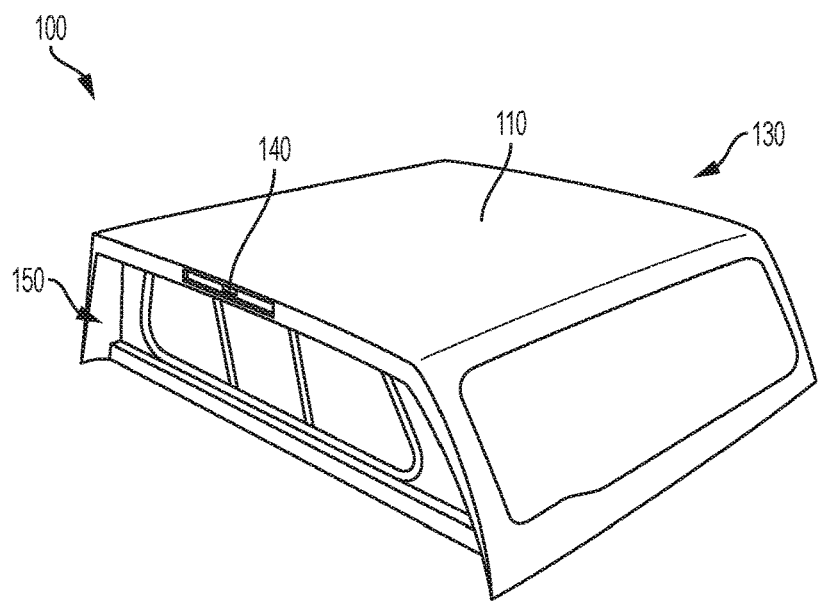
FIG. 1B is a front perspective view of a camper shell according to an embodiment of the present disclosure.
Figure 1C:
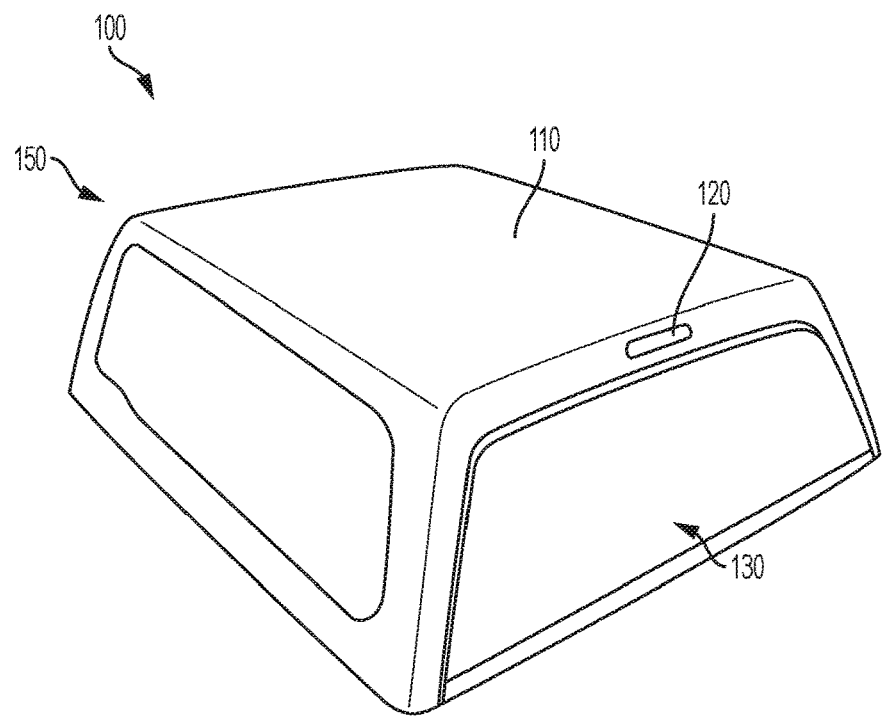
FIG. 1C is a rear perspective view of the camper shell.
Figure 1D:
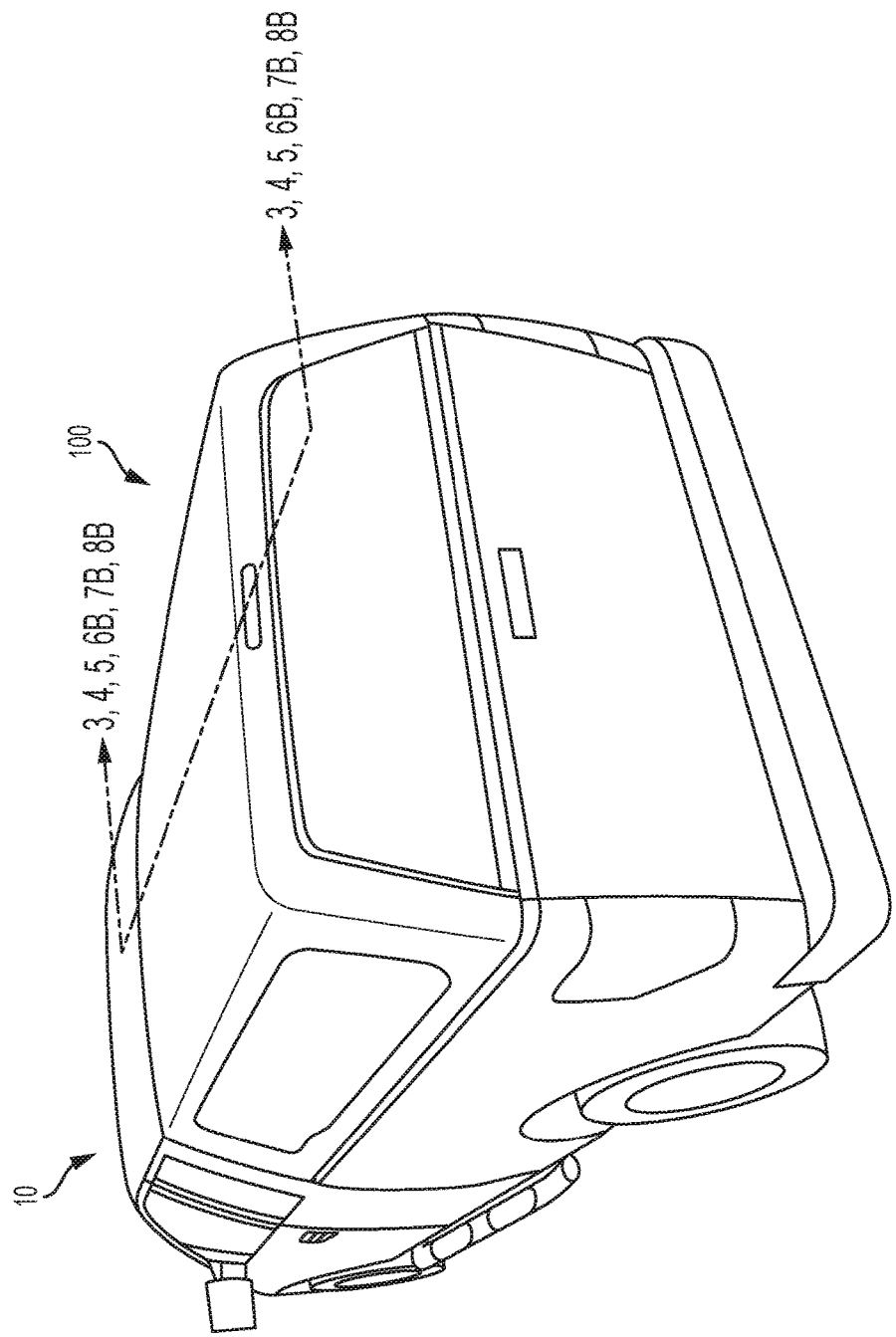
FIG. 1D is a perspective view of the truck with the camper shell installed thereon.

The present disclosure encompasses various embodiments of systems and devices for providing an auxiliary third brake light for use with a camper shell. As used herein, reference numbers 100, 400, 500 represent a custom shell with an auxiliary third brake light 120, 420, 520. Reference numbers 30, 30c represent a third party shell which is a hard shell 30 or a collapsible shell or topper 30c. Referring to FIGS. 1A-1D, 2A-2C, 3-5, 6A-6C, 7A-7C, and 8A-8C, a camper shell 100, 400, camper shell system 500, and brake light system 600, 700, 800 in accordance with embodiments of the present disclosure are shown, along with a truck 10 having a cab 12, a bed 14, and an Original Equipment Manufacturer (OEM) brake light 16 located on the cab 12. As shown in FIGS. 1D, 2A-2C, 3-5, 6A-6C, 7A-7C, and 8A-8C, when a shell body 110, 410 of the camper shell 100, 400, a shell body 510 of the camper shell system 500, or an existing camper shell 30, 30c (in the case of the brake light system 600, 700, 800) is fitted over the bed 14 of the truck 10, the shell body 110, 410, 510 or camper shell 30, 30c blocks the OEM third brake light 16. This may create a hazardous situation for drivers behind the truck 10 as they cannot see the OEM third brake light 16 and may not be able to tell when the truck 10 is braking. In order to remedy this situation, the camper shell 100, 400, camper shell system 500, and brake light system 600, 700, 800 have an auxiliary third brake light 120, 420, 520, 620, 720, 820 disposed at a rear portion 130, 430, 530 of the shell body 110, 410, 510 or at a rear portion 33 of the camper shell 30, 30c (in the case of the brake light system 600, 700, 800) adjacent to a tailgate 18 of the truck 10. The auxiliary third brake light 120, 420, 520, 620, 720, 820 may illuminate to inform drivers behind the truck 10 that the truck 10 is braking, even if the OEM third brake light 16 is blocked by the camper shell 100. Unlike conventional third brake light systems, the auxiliary third brake light 120, 420, 520, 620, 720, 820 does not need to be connected to any electrical wiring of the truck 10. The auxiliary third brake light when mounted to the camper shell is sized and positioned to the truck, truck bed and the OEM third brake light so that the user need not adjust the auxiliary third brake light when taking the camper shell off or on the truck bed. Thus, the user can have a significantly easier time taking the camper shell on or off the truck bed because when re-mounting the camper shell to the truck bed, the portion of the auxiliary third brake light that uses the OEM third brake light has already been pre positioned and goes back into the proper position.

Figure 6C:
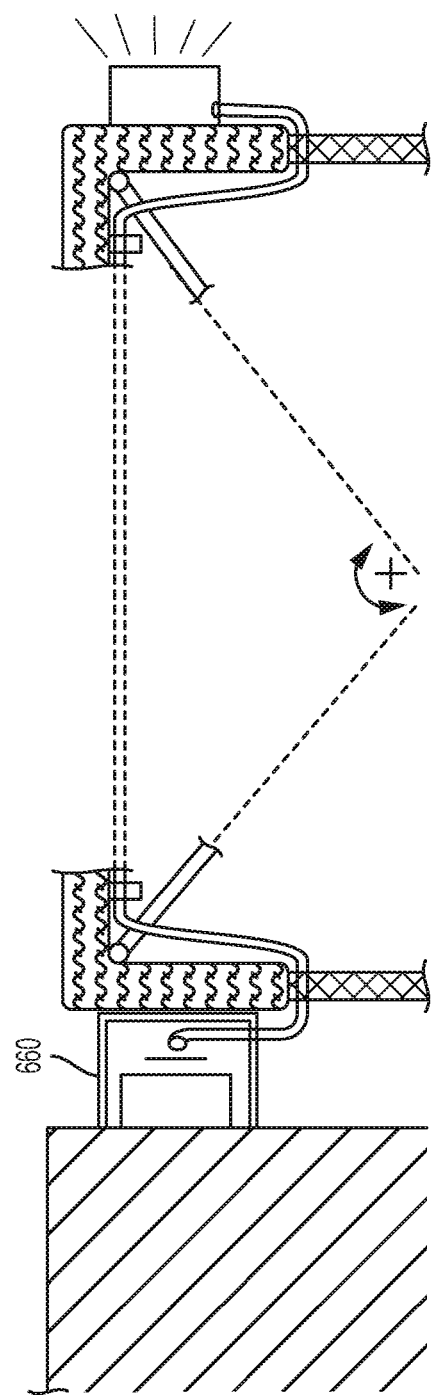
FIG. 6Ci is a cross sectional view of a collapsible camper shell together with the brake light system of FIG. 6A.

In the example of FIGS. 1A-1D and 3, the auxiliary third brake light 120 is connected to an optical waveguide 140 that extends to the rear portion 130 of the shell body 110 from a front portion 150 of the shell body 110 adjacent to the cab 12. The optical waveguide 140 is arranged to transmit light from the OEM third brake light 16 to a light fixture 122 of the auxiliary third brake light 120 (see FIG. 3). In the example of FIGS. 6A-6C, which is a retrofit version of the camper shell 100 with integrated auxiliary third brake light 120 of FIGS. 1A-1D and 3, the auxiliary third brake light 620 is similarly connected to an optical waveguide 640 that extends to the rear portion 33, 33c of an existing camper shell 30, 30c from a front portion 35, 35c of the shell body 30, 30c adjacent to the cab 12. The optical waveguide 640 is arranged to transmit light from the OEM third brake light 16 to a light fixture 622 of the auxiliary third brake light 620. In the examples of FIG. 4 (integrated) and FIGS. 7A-7C (retrofit), the auxiliary third brake light 420, 720 is connected to an electrical wire 440, 740 connected to an optical sensor 442, 742 arranged to sense light from the OEM third brake light 16. The auxiliary third brake light 420, 720 illuminates in response to a signal generated on the electrical wire 440, 740 by the optical sensor 442, 742. In the examples of FIG. 5 (integrated) and FIGS. 8A-8C (retrofit), a position sensor 570 is arranged to sense a depressed position of a brake pedal 20 of the truck 10, or an optical sensor 842 is arranged to sense light from the OEM third brake light 16, and the auxiliary third brake light 520, 820 is configured to illuminate based on a wireless signal transmitted in response to the position sensor 570 sensing the depressed position of the brake pedal 20 or the optical sensor 842 sensing the light from the OEM third brake light 16. In these and other contemplated ways as described herein, the auxiliary third brake light 120, 420, 520, 620, 720, 820 can illuminate in response to the illumination of the blocked OEM third brake light 16, with no need to tap into the electrical wiring of the truck's lighting system.

Figure 3:
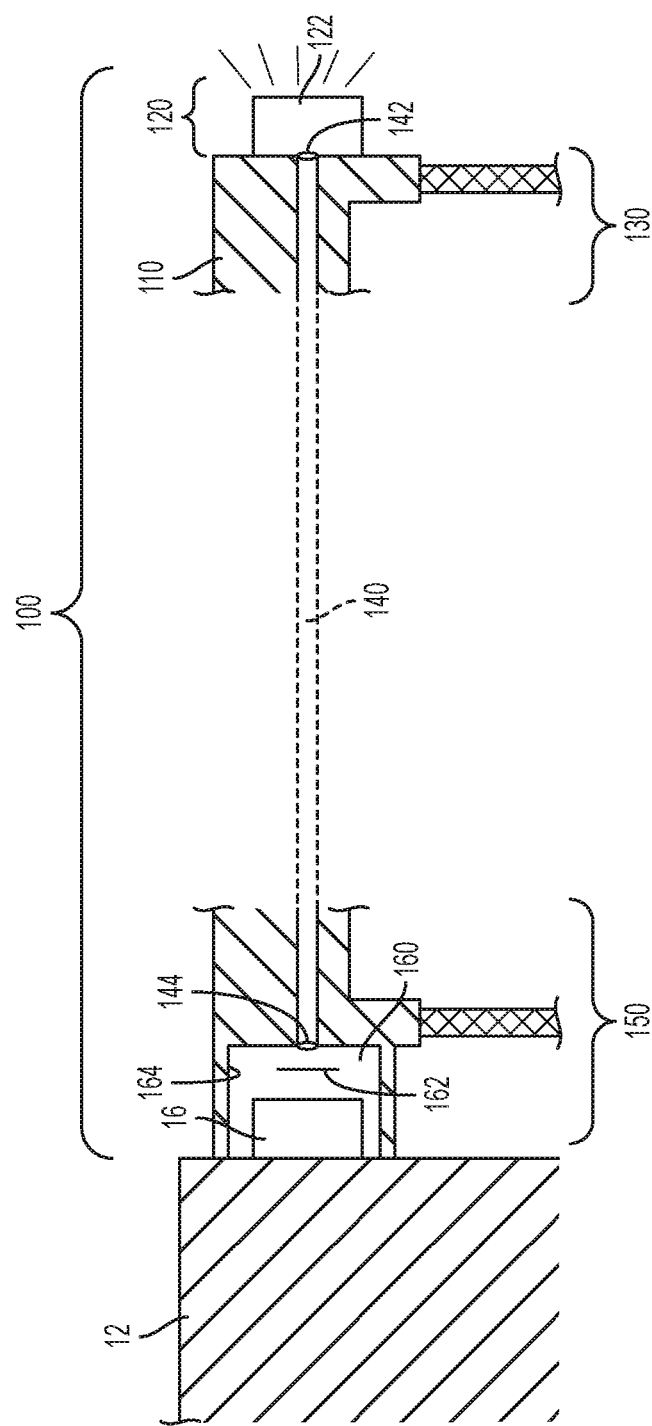
FIG. 3 is a cross sectional view of the camper shell of FIG. 1D.
Figure 4:
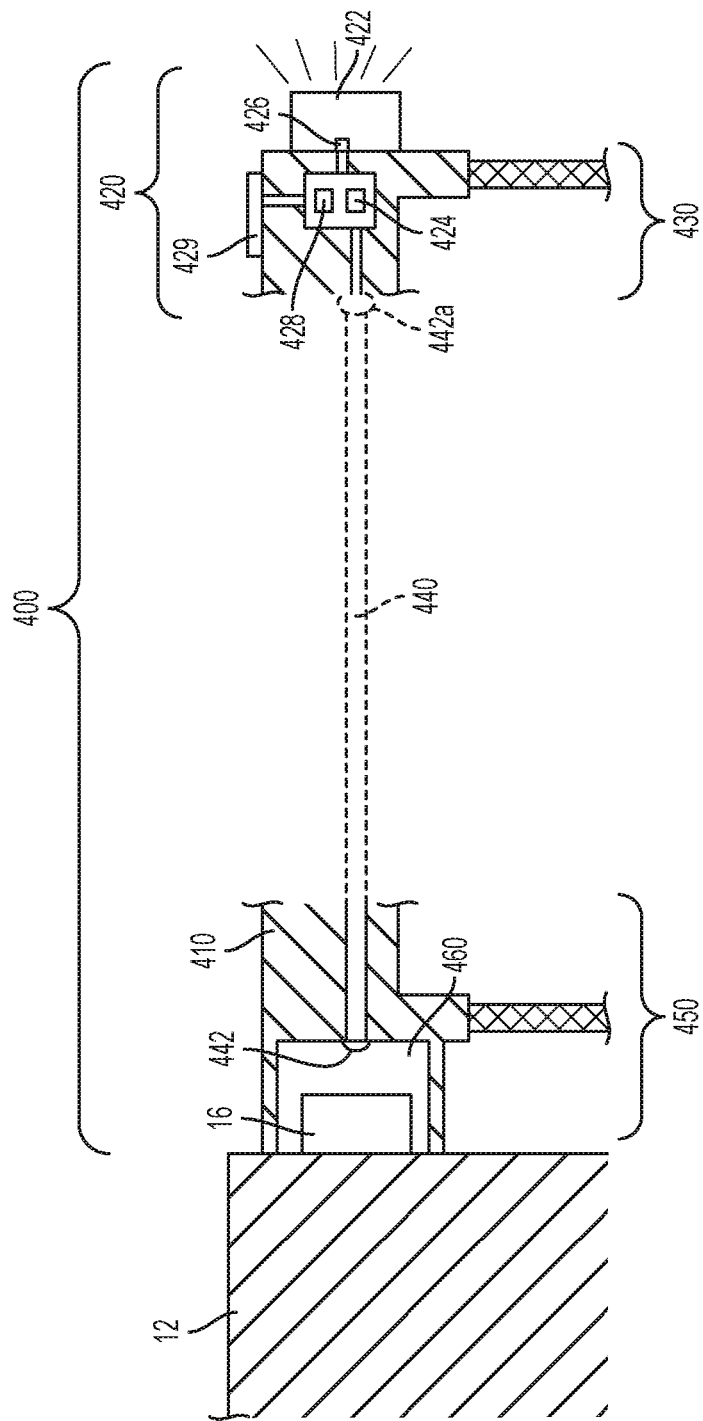
FIG. 4 is a cross sectional view of a camper shell according to another embodiment of the present disclosure.

As shown in FIG. 3, the optical waveguide 140 may be embedded within the shell body 110 of the camper shell 100. As noted above, the shell body 110 may have a front portion 150 and a rear portion 130. The front portion 150 may be a front quarter, third, or halfway of the shell body 110 from an end of the shell body 110 that faces the cab 12, and the rear portion 130 may be a rear quarter, third, or halfway of the shell body 110 from an end of the shell body 110 opposite the cab 12. At the rear portion 130 of the shell body 110, the optical waveguide 140 may terminate in an exit aperture 142 that opens into the light fixture 122, which may be, for example, a red light fixture as typically used for brake lights. At the front portion 150 of the shell body 110, the optical waveguide 140 may terminate in an entrance aperture 144 (e.g. a hole or an end surface) near the OEM third brake light 16. To aid in the collection of light from only the OEM third brake light 16 into the entrance aperture 144 of the optical waveguide 140, a recess 160 (e.g. a flexible or rigid cup or a cutout portion of the shell body 110) may be provided in the shell body 110 to fit over the OEM third brake light 16 and prevent outside light from entering. To this end, the recess 160 may, for example, surround the OEM third brake light 16 on all sides of the OEM third brake light 16 except the side that is mounted to the cab 12. The periphery of the recess 160 may touch the cab 12 or there may be a small gap (e.g. less than 10 mm, preferably less than 5 mm) between the periphery of the recess 160 and the cab 12 in order to enclose the OEM third brake light 16 and minimize the amount of outside light that enters the recess 160. In order to prevent the periphery of the recess 160 from scratching the cab 12 as the truck 10 moves, as well as to allow the periphery of the recess 160 to remain in contact with the cab 12, a flexible member such as a rubber gasket may be provided on the periphery of the recess 160. The rubber gasket also helps with eliminating outside light from entering the recess. With the external light prevented from entering the recess 160, substantially all or all of the light transmitted by the optical waveguide 140 will be light originating from the OEM third brake light 16. Therefore, the timing of the illumination of the auxiliary third brake light 120 will match the timing of the illumination of the OEM third brake light 16, thus producing an auxiliary third brake light 120 that responds to the braking of the truck 10.

Light collection may be further enhanced by the addition of an optical system comprising one or more lenses 162 arranged to focus the light from the OEM third brake light 16 onto the entrance aperture 144 of the optical waveguide 140. Instead, or in addition, the optical system may comprise one or more reflective surfaces 164 (e.g. mirrors) arranged within the recess 160 to collect light from the OEM third brake light 16 and direct the collected light toward the entrance aperture 144 or toward the one or more lenses 162. By providing such an optical system within the recess 160, a large percentage (e.g. >70%, more preferably >80%, more preferably >90%) of the light from the OEM third brake light 16 can be collected and transmitted by the optical waveguide 140 to illuminate the auxiliary third brake light 120. Since the OEM third brake light 16 may be designed to notify vehicles behind the truck 10 of braking, the greatest intensity of light may be directly in front of the OEM third brake light 16. Therefore, the entrance aperture 144 of the optical waveguide 140 and the optical system of the recess 160 may be disposed directly in front of the OEM third brake light 16. The front of the OEM third brake light 16 is a rear side of the OEM third brake light which is viewed by the car driver immediately behind the vehicle.

The optical waveguide 140 may be, for example, an optical fiber, a bundle of optical fibers, or any hollow tube or pipe (or bundle thereof) whose interior is lined with a reflective material or coating such as those known in the art of lighting as "light tubes" or "light pipes." In the example of FIGS. 1A-1D and 3, in which the light from the OEM third brake light 16 is itself cast on the light fixture 122 to illuminate the auxiliary third brake light 120, the exit aperture 142 of the optical waveguide 140 may include a diffuser to spread the light across the light fixture 122 and evenly illuminate the auxiliary third brake light 120.

The shell body 110 may be a hard body made of a rigid material such as fiberglass, thermoplast, metal (e.g. aluminum), and/or wood, or may be a wholly or partly soft body such as a collapsible (e.g. jointed) metal frame with a flexible material such as fabric (e.g. canvas) or vinyl disposed thereon. The shell body 110 may be the body of any kind of truck bed accessory, preferably one that blocks an OEM third brake light 16 (though it is contemplated that the disclosed embodiments may also be used with truck bed accessories that do not block an OEM third brake light 16). In this regard, the term "camper shell" is intended to refer to any truck bed accessory and may include accessories variously referred to in the industry as camper shells, truck caps, bed caps, box caps, truck toppers, truck canopies, etc. including convertible camper shells such as those described in U.S. Pat. Nos. 9,365,097, 9,744,836, and 9,956,857.

FIG. 4 shows a camper shell 400 in accordance with embodiments of the present disclosure, along with the truck 10 (see FIG. 1) having the cab 12 on which the OEM third brake light 16 is located. The camper shell 400 may be the same as the camper shell 100 of FIGS. 1A-1C, 2, and 3 and may include a shell body 410, auxiliary third brake light 420, rear portion 430, and front portion 450 that are the same as the shell body 110, auxiliary third brake light 120, rear portion 130, and front portion 150 except for the following differences. Whereas the auxiliary third brake light 120 of the camper shell 100 is illuminated directly by the light of the OEM third brake light 16 (i.e. by the light of the OEM third brake light 16 shining on the light fixture 122), the auxiliary third brake light 420 uses the light of the OEM third brake light 16 only for signaling when to illuminate the auxiliary third brake light 420, with the auxiliary third brake light 420 powered by a separate power source. As such, the auxiliary third brake light 420 may include, in addition to a light fixture 422 that may be the same as the light fixture 122, a switch circuit 424, a lamp 426 (e.g. LED or incandescent light bulb), and a battery 428. As shown in the example of FIG. 4, an electrical wire 440 embedded within the shell body 410 of the camper shell 400 may serve as an electric signal line extending from the front portion 450 to the rear portion 430 of the shell body 410. When the driver of the truck 10 activates the brakes, light from the blocked OEM third brake light 16 may be received by an optical sensor 442 connected to the electrical wire 440 at the front portion 450 of the shell body 410. An electric signal generated by the optical sensor 442 in response to the received light is transmitted by the electrical wire 440 to the auxiliary third brake light 420 at the rear portion 430 of the shell body 410, where it is received by the switch circuit 424. Upon receiving the electric signal from the electrical wire 440, the switch circuit 424 controls the lamp 426 to illuminate (thereby illuminating the surrounding light fixture 422) in response to the electric signal.

As a modification to the embodiment shown in FIG. 4, the optical waveguide 140 of FIG. 1 may be used in place of the electrical wire 440. In this case, the optical sensor 442 may be omitted and an optical sensor 442a may be provided as part of the auxiliary third brake light 420 located at the rear portion 430 of the shell body 410. When the driver of the truck 10 activates the brakes, light from the blocked OEM third brake light 16 may be received by the entrance aperture 144 of the optical waveguide 140 at the front portion 450 of the shell body 410. The resulting optical signal transmitted by the optical waveguide 140 may be received by the optical sensor 442a of the auxiliary third brake light 420 located at the rear portion 430 of the shell body 410. The switch circuit 424 may control the lamp 426 to illuminate (thereby illuminating the surrounding light fixture 422) in response to an electric signal generated by the optical sensor 442a. It is contemplated that the optical sensor 442a may be located at any position between the OEM third brake light 16 and the auxiliary third brake light 420, including in the middle of the shell body 410, with an optical waveguide 140 being used between the OEM third brake light 16 and the optical sensor 422a and an electrical wire 440 being used between the optical sensor 422a and the auxiliary third brake light 420.

In either of the above embodiments described in relation to FIG. 4, because the optical sensor 442 (or entrance aperture 144 in the case of using the optical waveguide 140) is being used only for signaling and not to power the illumination of the auxiliary brake light 420, it is only necessary to collect a small portion of the light from the OEM third brake light 16. Therefore, elements designed to enhance light collection such as the lenses 162 and reflective surfaces 164 can be omitted. By the same token, when the optical waveguide 140 is used only for signaling as in the above-described modification of the camper shell 400, it may be possible to select a smaller or less efficient (i.e. more leaky) optical waveguide 140 for cost savings. Meanwhile, in order to avoid distorting the signal with external light, it is still preferable in the embodiments of FIG. 4 to collect light only from the OEM third brake light 16. Therefore, a recess 460 may be provided in the shell body 410 to fit over the OEM third brake light 16, which may be the same as the recess 160 of the shell body 110.

The battery 428 may provide power to the auxiliary third brake light 420, for example, to illuminate the lamp 426 and provide power to any other circuit components of the auxiliary third brake light 420 requiring power. The battery 428 may be disposable or rechargeable. In the case of a rechargeable battery 428, a photovoltaic cell 429 may be provided to charge the battery 428 with solar energy. In this way, as long as the camper shell 400 is exposed to sunlight for part of the time (while the truck 10 is driven and/or while the truck 10 is parked), the battery 428 may be charged and the auxiliary third brake light 420 may operate.

FIG. 5 shows a camper shell system 500 in accordance with embodiments of the present disclosure, along with the truck 10 having the cab 12 on which the OEM third brake light 16 is located. The camper shell system 500 may be the same as the camper shell 400 of FIG. 4 and may include a shell body 510, auxiliary third brake light 520, rear portion 530, and front portion 550 that are the same as the shell body 410, auxiliary third brake light 420, rear portion 430, and front portion 450 except for the following differences. Whereas the auxiliary third brake light 420 of the camper shell 400 is illuminated in response to the illumination of the OEM third brake light 16, the auxiliary third brake light 520 is illuminated in response to a position sensor 570 sensing a depressed position of a brake pedal 20 of the truck 10. As such, the auxiliary third brake light 520 may include a wireless receiver 525 in addition to a light fixture 522, switch circuit 524, lamp 526, brake light battery 528, and photovoltaic cell 529 that may be the same as the light fixture 422, switch circuit 424, lamp 426, battery 428, and photovoltaic cell 429. The wireless receiver 525 may be configured to receive a wireless signal transmitted by a wireless transmitter 580 connected to the position sensor 570. When the driver of the truck 10 activates the brakes, the depressed position of the brake pedal 20 may be sensed by the position sensor 570, which may generate an electric signal indicating that the brake pedal 20 is depressed. In response to the position sensor 570 sensing the depressed position of the brake pedal 20 (e.g. in response to an electric signal generated by the position sensor 570), the wireless transmitter 580 may transmit a wireless signal that is received by the wireless receiver 525 of the auxiliary third brake light 520 at the rear portion 530 of the shell body 510. Upon the receipt of the wireless signal by the wireless receiver 525 (e.g. in response to an electric signal indicating such receipt), the switch circuit 524 may control the lamp 526 to illuminate (thereby illuminating the surrounding light fixture 522).

The position sensor 570 may include, for example, a beam emitter that emits a beam of light (e.g. infrared) and a beam receiver that receives the beam, similar to a garage door safety sensor. The beam emitter and beam receiver may be disposed opposite each other with a movable part of the brake pedal 20 (such as a pedal arm thereof) therebetween, positioned such that the beam is broken when the brake pedal 20 is depressed (or is broken until the brake pedal 20 is depressed). The position sensor 570 may thus sense that the brake pedal 20 is depressed when the beam is not received (or is received). Other arrangements are contemplated as well, such as where the position sensor 570 includes one part (e.g. a beam emitter) that is disposed on a movable part of the brake pedal 20 and one part (e.g. beam receiver) stationary relative to the brake pedal 20. As the brake pedal 20 is depressed, the two parts become misaligned and the beam is broken. It is also contemplated that a single emitter/receiver part may be paired with a mirror, with the beam being emitted by the emitter/receiver, reflected by the mirror, and received (or not received) by the emitter/receiver depending on the position of the brake pedal 20. Non-optical position sensors 570 are also contemplated. For example, a pair of accelerometers may be employed, one on a movable part of the brake pedal 20 and one stationary relative to the brake pedal 20, with a difference in accelerometer data indicating movement of the brake pedal 20. Other known principles of position measurement that may be used include ultrasonic, magnetic, inductive, and linear encoder means.

Because the auxiliary third brake light 520 operates in response to the depression of the brake pedal 20, it is not necessary for the auxiliary third brake light 520 to receive a signal from the OEM third brake light 16. Therefore, the optical or electric signal line 140, 440 described above in relation to FIGS. 1A-1D, 3, and 4, as well as the recess 160, 460, may be omitted.

The wireless receiver 525 and wireless transmitter 580 may communicate using any known radio communication standard and may include antenna elements tuned to appropriate frequencies. If two-way communication is used, the wireless receiver 525 and wireless transmitter 580 may be transceivers.

The wireless receiver 525 may receive power from the brake light battery 528 along with the other circuit elements of the auxiliary third brake light 520. On the other hand, the elements of the camper shell system 500 that are disposed in the cab 12 of the truck 10 may receive power from a different source. For example, power for the position sensor 570 and/or wireless transmitter 580 may be provided by a position sensor battery 590. The position sensor battery 590 may be disposable or rechargeable. In the case of a rechargeable position sensor battery 590, a charger 595 (e.g. a USB charging cable) may be provided to charge the position sensor battery 590 with energy from a battery of the truck 10. For example, the charger 595 may be kept plugged in to a charging outlet (e.g. a USB power outlet) located in the cab 12 of the truck 10. Alternatively, a photovoltaic cell may be provided to charge the position sensor battery 590 with solar energy, similar to the photovoltaic cell 529 that may charge the brake light battery 528. It is also contemplated that the position sensor battery 590 may be bypassed or omitted, with the position sensor 570 and/or wireless transmitter 580 being powered by direct connection to the charging outlet (e.g. via a USB cable such as charger 595).

In the examples of the camper shell 100, camper shell 400, and camper shell system 500 described above, a hard or soft shell body 110, 410, 510 is provided on which the auxiliary third brake light 120, 420, 520 is provided and through which an electric or optical signal line 140, 440 is formed. However, the disclosure is not intended to be so limited and it is further contemplated to provide a brake light system as a retrofit for an existing camper shell 30, 30c. Examples of such a brake light system are described with reference to FIGS. 2A-2C, 6A-6C, 7A-7C, and 8A-8C.

FIG. 6A shows a brake light system 600 in accordance with embodiments of the present disclosure. The brake light system 600 includes an auxiliary third brake light 620, a light collecting cup 660, and an optical waveguide 640 connecting the auxiliary third brake light 620 with the light collecting cup 660. FIG. 6B shows the brake light system 600 along with the truck 10 having the cab 12 on which the OEM third brake light 16 is located and an existing camper shell 30 to be retrofitted with the brake light system 600.

FIG. 6C shows the brake light system 600 along with the truck 10 having the cab 12 on which the OEM third brake light 16 is located an existing collapsible camper shell 30c. The camper shell 30, 30c may have a rear portion 33, 33c adjacent to the tailgate 18 of the truck 10 (see FIG. 1A) and a front portion 35, 35c adjacent to the cab 12. The camper shell 30, 30c may also have a rear opening 34, 34c at the rear portion 33, 33c and a front opening 36, 36c at the front portion 35, 35c, which may be, for example, sliding or hinged windows or doors. When the camper shell 30, 30c is fitted over the bed 14 of the truck 10 (see FIG. 1A), the camper shell 30, 30c blocks the OEM third brake light 16, creating a hazardous situation for drivers behind the truck 10 as they may not be able to tell when the truck 10 is braking. In order to remedy this situation, rather than replacing the camper shell 30, 30c with a camper shell 100, 400 or camper shell system 500 as described above, the existing camper shell 30, 30c may be retrofitted with the brake light system 600 including the auxiliary third brake light 620, the light collecting cup 660, and the optical waveguide 640 connecting the auxiliary third brake light 620 with the light collecting cup 660. To use the brake light system 600, a person may simply attach (e.g., adhesive, mechanical attachment, nut and bolts, screws, liquid welds) the auxiliary third brake light 620 to the rear portion 33, 33c of the camper shell 30, to the tailgate 18, or anywhere else where it may be visible to drivers behind the truck 10, attach the light collecting cup 660 to the front portion 35, 35c of the camper shell 30 where it may collect light from the OEM third brake light 16, and run the optical waveguide 640 therebetween. With the brake light system 600 so disposed, the optical waveguide 640 may transmit light from the OEM third brake light 16 to a light fixture 622 of the auxiliary third brake light 620. In this way, the auxiliary third brake light 620 can illuminate in response to the illumination of the blocked OEM third brake light 16, with no need to tap into the electrical wiring of the truck's lighting system.

The optical waveguide 640 may be run from the rear portion 35, 35c to the front portion 33, 33c of the camper shell 30, 30c by any desired path, including over, under, through, and to the side of the camper shell 30, 30c. In order to keep the optical waveguide 640 protected from damage caused by weather or the sun, it is contemplated that the optical waveguide 640 may be run through the camper shell 30, 30c as shown in FIGS. 6B and 6C, exiting the light collecting cup 660 at the bottom, entering the camper shell 30, 30c through the front opening 36, 36c (or through a drilled hole sealed with a silicone bead), running along the interior ceiling of the camper shell 40 (e.g. held in place by hooks or loops 641 such as Veclro® loops), exiting the camper shell 30, 30c through the rear opening 34, 34c (or through a drilled hole sealed with a silicone bead), and entering the auxiliary third brake light 620 from below. The optical waveguide 640 may terminate in an exit aperture 642 that spills out into the light fixture 622, which may be, for example, a red light fixture as typically used for brake lights. At the front portion 35, 35c of the camper shell 30, 30c, the optical waveguide 640 may terminate in an entrance aperture 644 located within the light collecting cup 660. In this regard, the optical waveguide 640 may pass through a hole in the wall of the light collecting cup 660 or may be integrally formed with the light collecting cup 660. To aid in the collection of light from only the OEM third brake light 16 into the entrance aperture 644 of the optical waveguide 640, the light collecting cup 660 may be sized to fit over the OEM third brake light 16 and prevent outside light from entering. Since the only light transmitted by the optical waveguide 640 will be the light originating from the OEM third brake light 16, the illumination of the auxiliary third brake light 620 will match the illumination of the OEM third brake light 16, thus faithfully producing an auxiliary third brake light 620 that responds to the braking of the truck 10. As in the case of the camper shell 100 of FIG. 3, light collection by the light collecting cup 660 may be further enhanced by the addition of an optical system comprising one or more lenses 662 arranged to focus the light from the OEM third brake light 16 onto the entrance aperture 644 of the optical waveguide 640. Instead, or in addition, the optical system may comprise one or more reflective surfaces 664 (e.g. mirrors) arranged within the light collecting cup 660 to collect light from the OEM third brake light 16 and direct the collected light toward the entrance aperture 644 or toward the one or more lenses 662. By providing such an optical system within the light collecting cup 660, a large percentage (e.g. >70%, more preferably >80%, more preferably >90%) of the light from the OEM third brake light 16 can be collected and transmitted by the optical waveguide 640 to illuminate the auxiliary third brake light 620.

Like the optical waveguide 140 of FIG. 3, the optical waveguide 640 may be, for example, an optical fiber, a bundle of optical fibers, or any hollow tube or pipe (or bundle thereof) whose interior is lined with a reflective material or coating such as those known in the art of lighting as "light tubes" or "light pipes." The exit aperture 642 of the optical waveguide 640 may include a diffuser to spread the light across the light fixture 622 and evenly illuminate the auxiliary third brake light 620.

The light collecting cup 660 may be a cylindrical, rectangular, or other arbitrarily shaped hollow piece that is open on at least one side to fit over the OEM third brake light 16 and in which the entrance aperture 644 of the optical waveguide 640 may be housed together with any optical system as described above. The entrance aperture 644 and optical system of the light collecting cup 660 may advantageously be disposed in a way that maximizes light collection. Since the OEM third brake light 16 may be designed to notify vehicles behind the truck 10 of braking, the greatest intensity of light may be directly in front of the OEM third brake light 16. Therefore, the entrance aperture 644 and optical system of the light collecting cup 660 may be disposed directly in front of the OEM third brake light 16 as shown in FIGS. 6B and 6C. It is contemplated that the light collecting cup 660 may be made of a rigid plastic (e.g. fiberglass), metal (e.g. aluminum), or any other material and may be made of the same or a different material as the camper shell 30, 30c.

Attachment of the light collecting cup 660, auxiliary third brake light 620, and hooks or loops 641 may be accomplished by drilling holes in the camper shell 30, 30c and securing with bolts or by less destructive methods such as using adhesives or ties. As an example, the brake light system 600 may be provided as a kit including double-sided adhesive sheets sized for each of the components, where one side adheres to the camper shell 30, 30c and the other side adheres to the light collecting cup 660, auxiliary third break light 620, or hooks/loops 641. Using any of such attachment means, a person may install the brake light system 600 by first attaching the light collecting cup 660 to the camper shell 30, 30c at the front portion 35, 35c, subsequently running the auxiliary third brake light 620 and optical waveguide 640 through the openings 34, 34c and 36, 36c as shown in FIGS. 6B and 6C (e.g. leaving the optical waveguide 640 disposed between a frame of a window/door and a rubber trim or tubing thereof), and finally attaching the auxiliary third brake light 620 to the camper shell 30, 30c at the rear portion 33, 33c, to the tailgate 18, or somewhere else where it will be visible to vehicles behind the truck 10. Alternatively, one may do the same process in reverse by first attaching the auxiliary third brake light 620 and thereafter attaching the light collecting cup 660. Or, a person might attach both the auxiliary third brake light 620 and the light collecting cup 660 after the optical waveguide 640 is run through the camper shell 30, 30c through both openings 34, 34c and 36, 36c. The hooks/loops 641 may be installed before or after the optical waveguide 640 is run through the camper shell 30, 30c, depending on whether the hooks/loops 641 can be opened and closed after they are attached to the camper shell 30, 30c. The installation of the brake light system 600 may be done before or after the camper shell 30, 30c is installed on the truck 10.

Because the brake light system may be self-contained on the camper shell 100, 400, 500, 30 and 30c in that it 100, 400, 500, 30 and 30c may be solely secured to the camper shell 100, 400, 500 30, 30c (i.e., the brake light and brake light system are not electrically connected to the electrical system of the truck), certain benefits may be realized. By way of example and not limitation, after installing the brake light system 600, 700, 800 on the camper shell 30, 30c, the brake light system 600 may be left on the camper shell 30, 30c and the camper shell 30 may be removed from the truck or the collapsible camper shell 30c may be collapsed without having to disconnect any electrical connection between the brake light system 600 and the truck's electrical system. For example, in relation to the collapsible shell 30c, referring now to FIGS. 6Ci-iii, 7Ci-iii and 8Ci-iii, the light collecting cups 660, 760, 860 may initially be pressed against in contact with the OEM third brake light as shown in FIGS. 6Ci, 7Ci, 8Ci. In the process of collapsing the collapsible shell 30c, the light collecting cups 660, 760, 860 are initially pulled away from the OEM third brake light and the cab of the truck. Once the light collecting cups 660, 760, 860 clears the cab and the OEM third brake light, the shell frame collapses down as shown in FIGS. 6Cii, iii, 7Cii, iii, 8Cii, iii. The collapsible shell 30c illustrated in FIGS. 6Ci-iii, 7Ci-iii, and 8Ci-iii is the collapsible shell sold under the tradename SOFTOPPER at www.softopper.com. The various aspects discussed herein can be employed in other collapsible shells sold in the market. No electrical connection between the brake light system 600, 700, 800 and the truck's electrical system was needed to operate the brake light system 600, 700, 800. As such, to collapse the shell 30c, no electrical connection therebetween had to be disconnected. In relation to the shell 30, when the shell 30 is removed from the truck bed, the light collecting cup 660, 760, 860 of the brake light system 600, 700, 800 is pulled off of the OEM third brake light without any need to disconnect the electrical system.

When the camper shell 100, 400, 500, 30 is removed from the truck 10 or the collapsible camper shell 30c collapsed, the OEM third brake light of the truck 10 is unblocked when the camper shell 100, 400, 500, 30, 30c. The OEM third brake light of the truck is used when the camper shell 100, 400, 500, 30 and 30c is removed or collapsed. When the camper shell 100, 400, 500, 30 is mounted on the truck bed or the shell 30c is erected, the camper shell 100, 400, 500, 30, 30c blocks the OEM third brake light and the auxiliary third brake light is now functional. When the shell is removed, mounted, collapsed or erected, the auxiliary third brake light remains in position so that when the shell 100, 400, 500, 30 is mounted to the truck bed or the shell 30c is erected, the light collecting cup 660, 760, 860 is properly positioned to the OEM third brake light and the auxiliary third brake light is functional.

The auxiliary brake light is preferably not physically attached (e.g., screwed, permanently adhered) to the truck so that the auxiliary brake light need not be unscrewed or adhesive removed when the camper shell 100, 400, 500, 30, 30c is removed or collapsed as the case may be. However, it may be the case that an adhesive may be used to mount the light collecting cup 660, 760, 860 to the OEM third brake light.

Figure 7B:
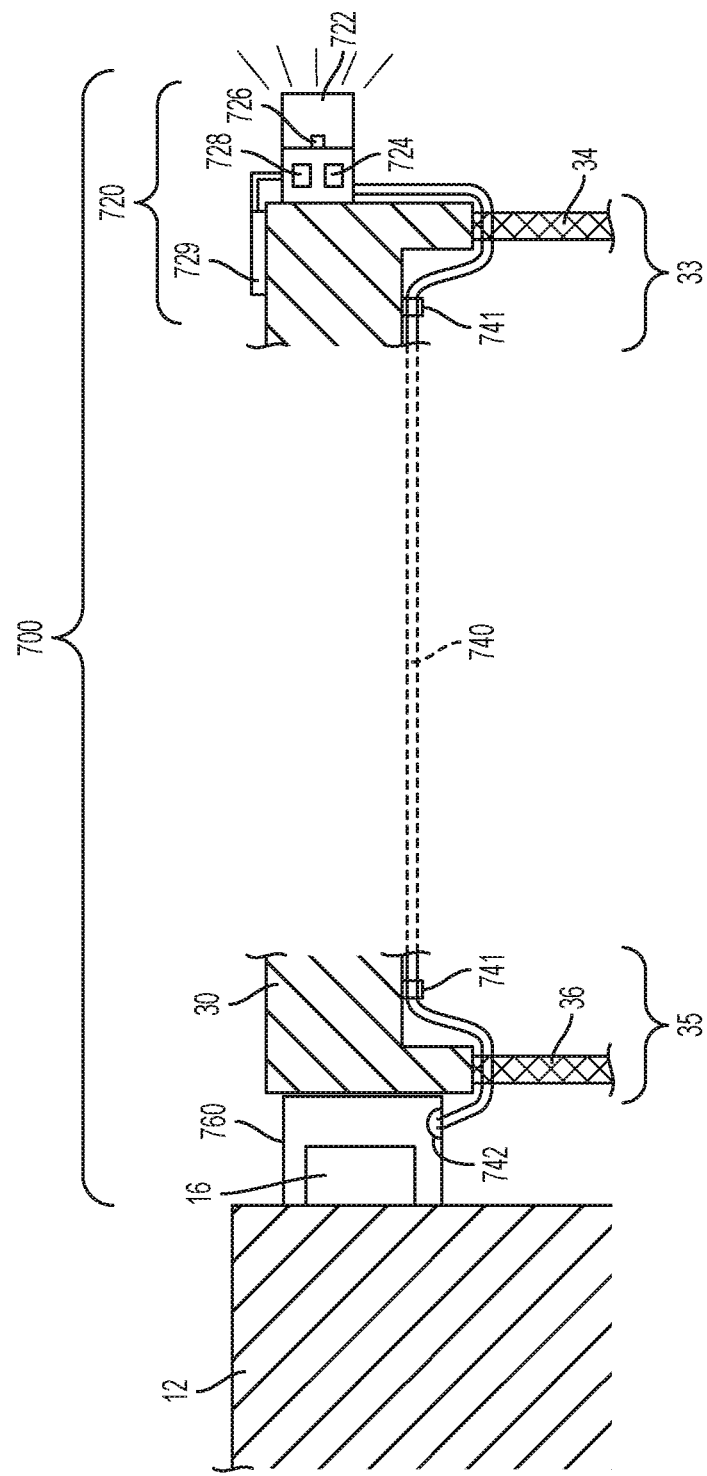
FIG. 7B is a cross sectional view of a camper shell together with the brake light system of FIG. 7A.
Figure 7C:
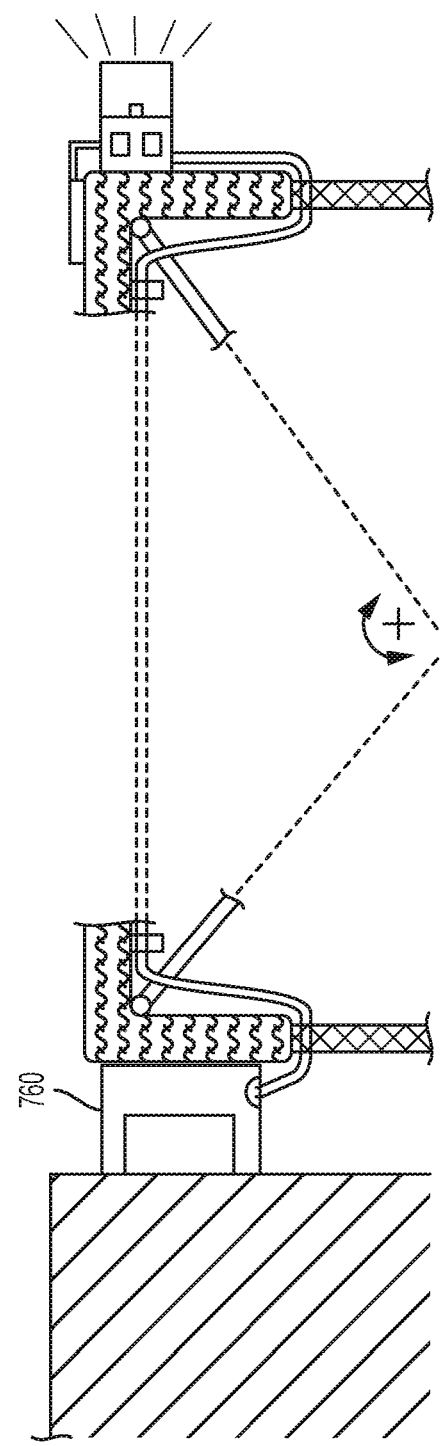
FIG. 7Ci is a cross sectional view of a collapsible camper shell together with the brake light system of FIG. 7A.

FIG. 7A shows a brake light system 700 in accordance with embodiments of the present disclosure. FIG. 7B shows the brake light system 700 along with the truck 10 having the cab 12 on which the OEM third brake light 16 is located and the existing camper shell 30. FIG. 7C shows the brake light system 700 along with the truck 10 having the cab 12 on which the OEM third brake light 16 is located and the existing collapsible camper shell 30c. In the examples of FIGS. 7B and 7C, the camper shell 30, 30c is retrofitted with the brake light system 700. The brake light system 700 may be the same as the brake light system 600 of FIGS. 6A-6C and may include an auxiliary third brake light 720, a light collecting cup 760, and hooks or loops 741 that are the same as the auxiliary third brake light 620, light collecting cup 660, and hooks/loops 641 except for the following differences. Whereas the auxiliary third brake light 620 of the brake lighting system 600 is illuminated directly by the light of the OEM third brake light 16 (i.e. by the light of the OEM third brake light 16 shining on the light fixture 622), the auxiliary third brake light 720 uses the light of the OEM third brake light 16 only for signaling when to illuminate the auxiliary third brake light 720, with the power for illuminating the auxiliary third brake light 720 coming from a separate power source. In this regard, the auxiliary third brake light 720 functions similarly to the auxiliary third brake light 420 of FIG. 4. As such, the auxiliary third brake light 720 may include, in addition to a light fixture 722 that may be the same as the light fixture 622, a switch circuit 724, a lamp 726, a battery 728, and a photovoltaic cell 729 that are the same as the switch circuit 424, lamp 426, battery 428 and photovoltaic cell 429 except for their being attachable to the existing camper shell 30, 30c (rather than part of the camper shell 400).

As shown in the example of FIGS. 7A-7C, an electrical wire 740 may serve as an electric signal line extending from the front portion 35, 35c to the rear portion 33, 33c of the camper shell 30, 30c. The electrical wire 740 may be the same as the electrical wire 440 except that it is attachable to the existing camper shell 30, 30c (rather than part of the camper shell 400). When the driver of the truck 10 activates the brakes, light from the blocked OEM third brake light 16 may be received by an optical sensor 742 connected to the electrical wire 740 at the front portion 35, 35c of the camper shell 30, 30c. An electric signal generated by the optical sensor 742 in response to the received light is transmitted by the electrical wire 740 to the auxiliary third brake light 720 at the rear portion 33, 33c of the camper shell 30, 30c, where it is received by the switch circuit 724. Upon receiving the electric signal from the electrical wire 740, the switch circuit 724 controls the lamp 726 to illuminate (thereby illuminating the surrounding light fixture 722) in response to the electric signal.

As a modification to the embodiment shown in FIGS. 7A-7C, the optical waveguide 640 of FIGS. 6A-6C may be used in place of the electrical wire 740. In this case, the optical sensor 742 may be omitted and an optical sensor may be provided as part of the auxiliary third brake light 720 located at the rear portion 33, 33c of the shell body 30, 30c. When the driver of the truck 10 activates the brakes, light from the blocked OEM third brake light 16 may be received by the entrance aperture 644 of the optical waveguide 640 at the front portion 35, 35c of the camper shell 30, 30c. The resulting optical signal transmitted by the optical waveguide 640 may be received by the optical sensor of the auxiliary third brake light 720 located at the rear portion 33, 33c of the camper shell 30, 30c. The switch circuit 724 may control the lamp 726 to illuminate (thereby illuminating the surrounding light fixture 722) in response to an electric signal generated by the optical sensor.

In either of the above embodiments described in relation to FIGS. 7A-7C, because the optical sensor 742 (or entrance aperture 644 in the case of using the optical waveguide 640) is being used only for signaling and not to power the illumination of the auxiliary brake light 720, it is only necessary to collect a small portion of the light from the OEM third brake light 16. Therefore, elements designed to enhance light collection such as the lenses 662 and reflective surfaces 664 can be omitted. By the same token, when the optical waveguide 640 is used only for signaling as in the above-described modification of the brake light system 700, it may be possible to select a smaller or less efficient (i.e. more leaky) optical waveguide 640 for cost savings. Meanwhile, in order to avoid distorting the signal with external light, it is still preferable in the embodiments of FIGS. 7A-7C to collect light only from the OEM third brake light 16. Therefore, the light collecting cup 760 may be provided to fit over the OEM third brake light 16, which may be the same as the light collecting cup 660 of the brake light system 600.

Installation of the brake light system 700 may be the same as installation of the brake light system 600, using the same attachment means for the light collecting cup 760, auxiliary third brake light 720 (including photovoltaic cell 729 etc.), and hooks/loops 741 as may be used for the light collecting cup 660, auxiliary third brake light 620, and hooks/loops 641. Minor differences may include that the optical sensor 742 may be more freely disposed within the light collecting cup 760 (e.g. off to the side or on the bottom of the light collecting cup 760 as shown in FIGS. 7A-7C), as opposed to the case of the brake light system 600 where it may be advantageous to dispose the entrance aperture 644 centrally with respect to the OEM third brake light 16 as described above.

Figure 8B:
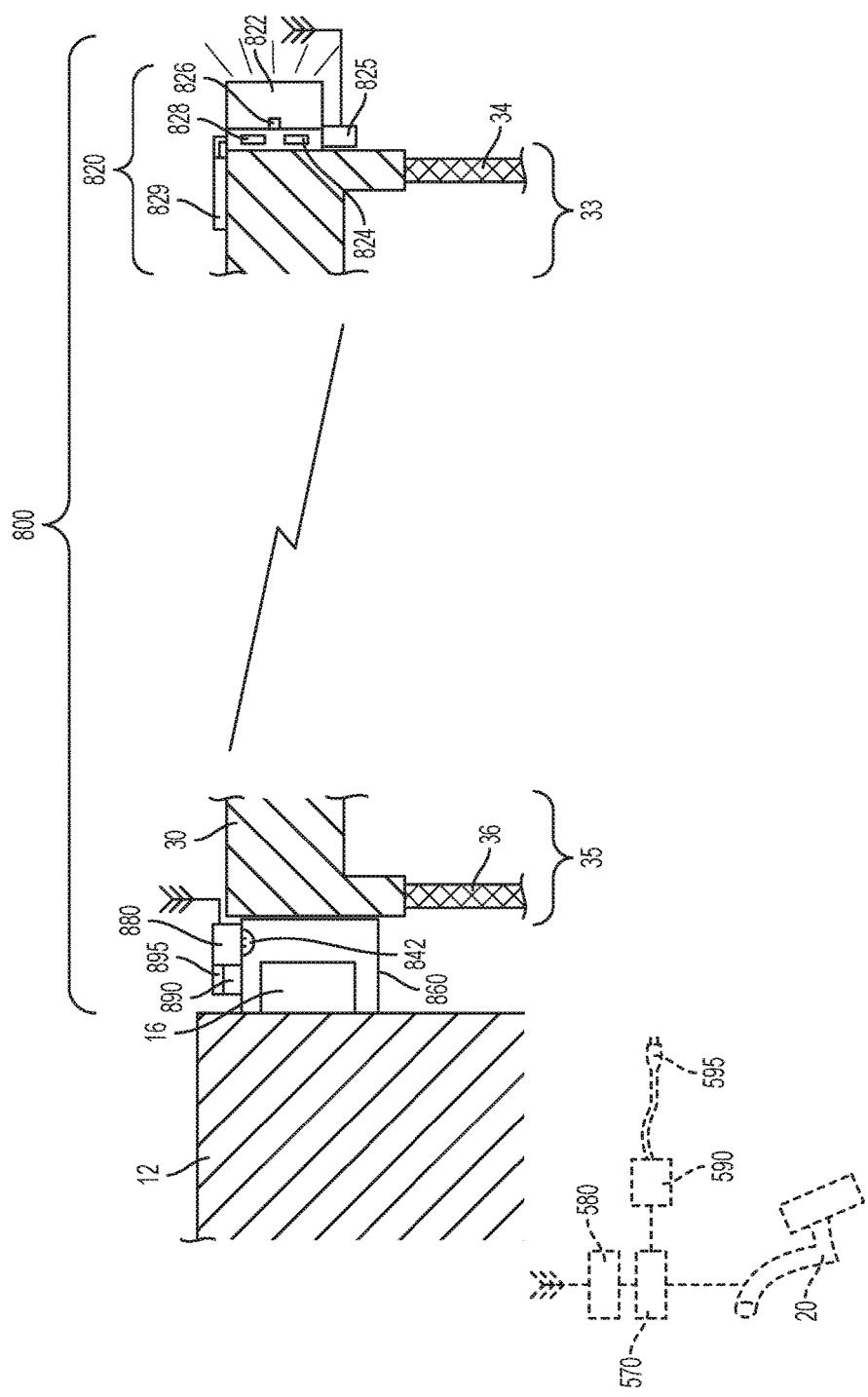
FIG. 8B is a cross sectional view of a camper shell together with the brake light system of FIG. 8A.
Figure 8C:
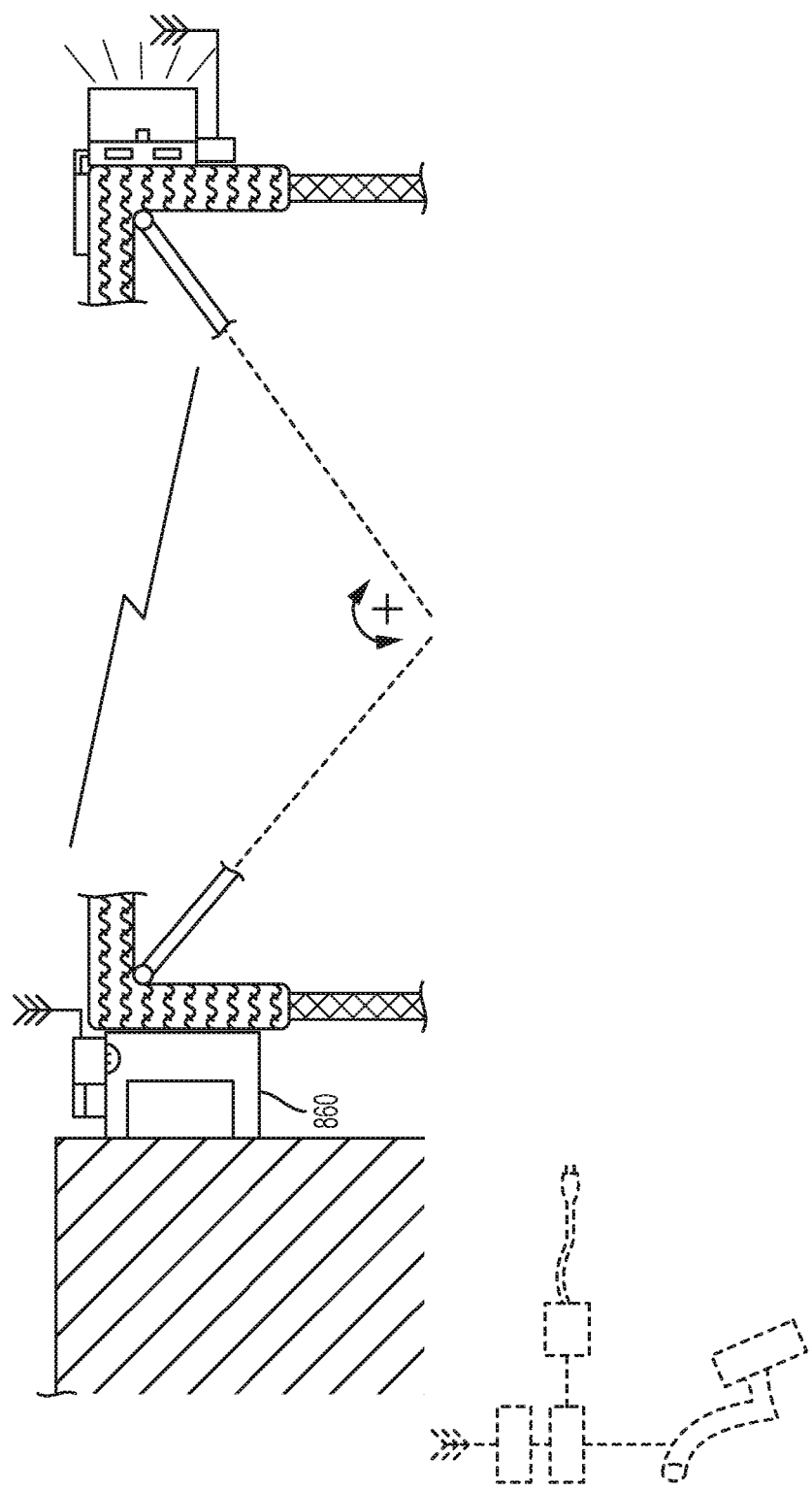
FIG. 8Ci is a cross sectional view of a collapsible camper shell together with the brake light system of FIG. 8A.

FIG. 8A shows a brake light system 800 in accordance with embodiments of the present disclosure. FIG. 8B shows the brake light system 800 along with the truck 10 having the cab 12 on which the OEM third brake light 16 is located and the existing camper shell 30. FIG. 8C shows the brake light system 800 along with the truck 10 having the cab 12 on which the OEM third brake light 16 is located and the existing collapsible camper shell 30c. In the examples of FIGS. 8B and 8C, the camper shell 30, 30c is retrofitted with the brake light system 800. The brake light system 800 may be the same as the brake light system 700 of FIGS. 7A-7C and may include an auxiliary third brake light 820 and light collecting cup 860 having an optical sensor 842 that are the same as the auxiliary third brake light 720 and light collecting cup 760 with optical sensor 742 except for the following differences. Whereas an electrical wire 740 is used to transmit a signal from the optical sensor 742 to the auxiliary brake light 720, the brake light system 800 uses wireless transmission between a wireless transmitter 880 connected to the optical sensor 842 and a wireless receiver 825 of the auxiliary brake light 820. Thus, the electrical wire 740 and hooks/loops 741 may be omitted. The wireless receiver 825 and wireless transmitter 880 may communicate using any known radio communication standard and may include antenna elements tuned to appropriate frequencies. If two-way communication is used, the wireless receiver 825 and wireless transmitter 880 may be transceivers.

The wireless receiver 825 may receive power from the brake light battery 828 along with the other circuit elements of the auxiliary third brake light 820. Similarly, the wireless transmitter 880 may be powered by a transmitter battery 890 that may be disposable or rechargeable and, in the case of a rechargeable transmitter battery 890, a photovoltaic cell 895 may be provided to charge the transmitter battery 890 with solar energy.

Installation of the brake light system 800 may be the same as installation of the brake light system 700, using the same attachment means for the light collecting cup 860 and auxiliary third brake light 820 (including wireless receiver 825, photovoltaic cell 829, etc.) as may be used for the light collecting cup 760 and auxiliary third brake light 720, but without the need to run an electrical wire 760 through the camper shell or 30, 30c or install hooks/loops 741. Also, as in the case of the brake light system 700, the optical sensor 842 may be freely disposed within the light collecting cup 860 and may, for example, be disposed on the top of the light collecting cup 860 in order to place the circuitry connecting the optical sensor 842 and the wireless transmitter 880 near the photovoltaic cell 895.

As an alternative to the light collecting cup 860 having the optical sensor 842, the brake light system 800 may instead make use of the same position sensor 570 that senses a depressed position of the brake pedal 20 of the truck 10 as described in relation to FIG. 5. In this case, the position sensor 570, wireless transmitter 580, position sensor battery 590, and charger 595 may be used in place of the light collecting cup 860, optical sensor 842, wireless transmitter 880, transmitter battery 890, and photovoltaic cell 895. The auxiliary third brake light 820 may thus be illuminated in response to the position sensor 570 sensing a depressed position of the brake pedal 20.

In the examples of FIGS. 4, 5, 7A-7C, and 8A-8C, it is described that the batteries 428, 528, 728, 828, 890 may be charged by photovoltaic cells 429, 529, 729, 829, 895. However, the present disclosure is not limited to the use of solar power. As an alternative, the batteries 428, 528, 728, 828 may be charged via a charger (e.g. a USB charging cable) plugged in to an external charging outlet 19 (see FIG. 1A) located on the bed 14 or tailgate 18 of the truck 10 (e.g. on the interior of the bed 14 as shown, or on the exterior of the bed 14). The external charging outlet 19 may be a USB compatible port. It may also be weatherproof so that rainwater and sunshine does not degrade the external charging outlet 19 and yet allows the charger to be plugged into the external charging outlet 19. Similarly, the battery 890 may be charged via a charger (e.g. a USB charging cable) plugged in to the external charging outlet 19 (see FIG. 1A) located on the cab 12 of the truck 10 (e.g. near the OEM third brake light 16 as shown). In this way, the batteries 428, 528, 728, 828, 890 may be charged with energy from a battery of the truck 10. It is also contemplated that any of the batteries 428, 528, 728, 828, 890 may be bypassed or omitted. By way of example and not limitation, the elements (e.g., auxiliary brake light) to be powered by the batteries may be powered by direct connection to the external charging outlet 19 (e.g. via a USB cable).

Figure 2A:
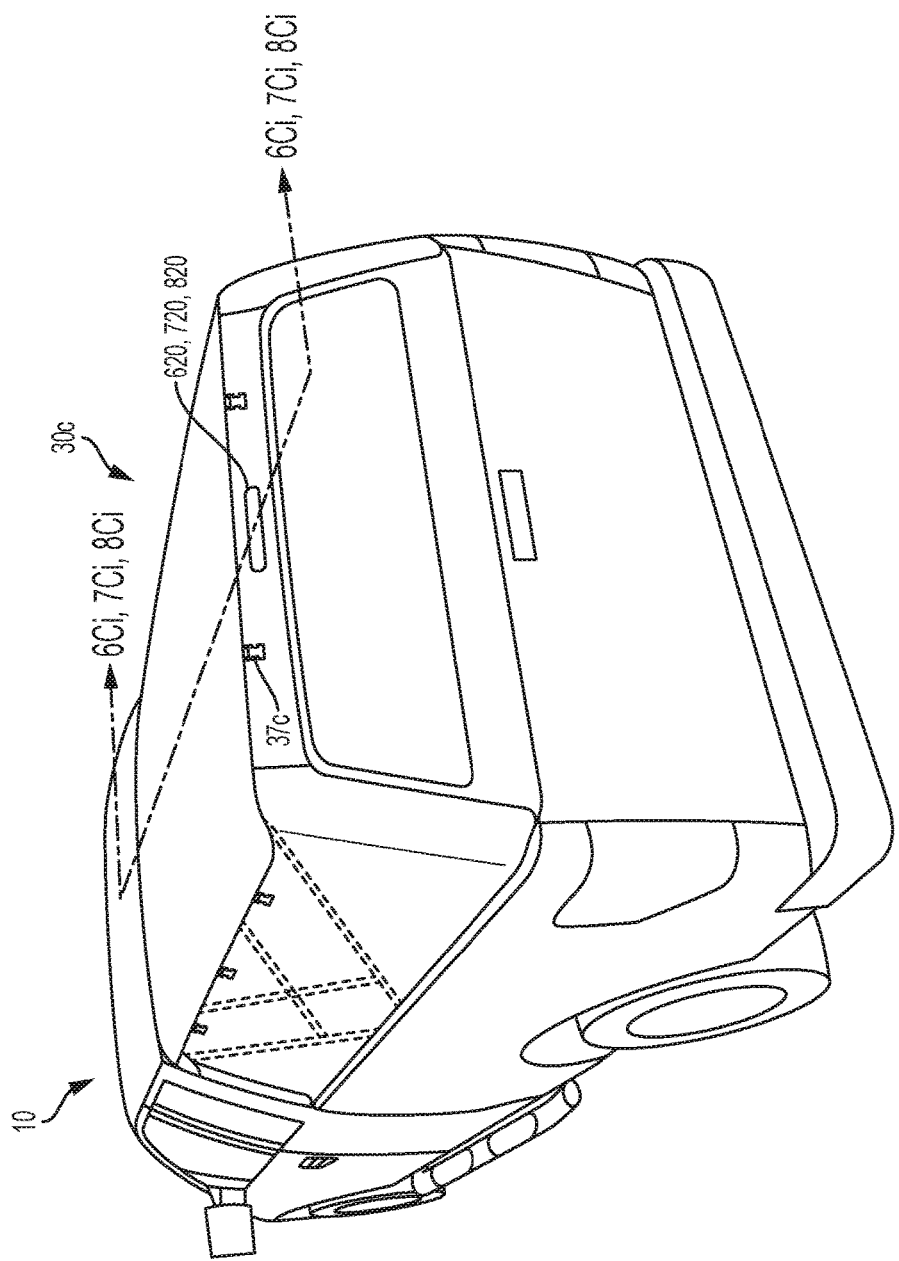
FIG. 2A is a perspective view of the truck with a collapsible camper shell installed thereon together with a brake light system according to another embodiment of the present disclosure.
Figure 2B:
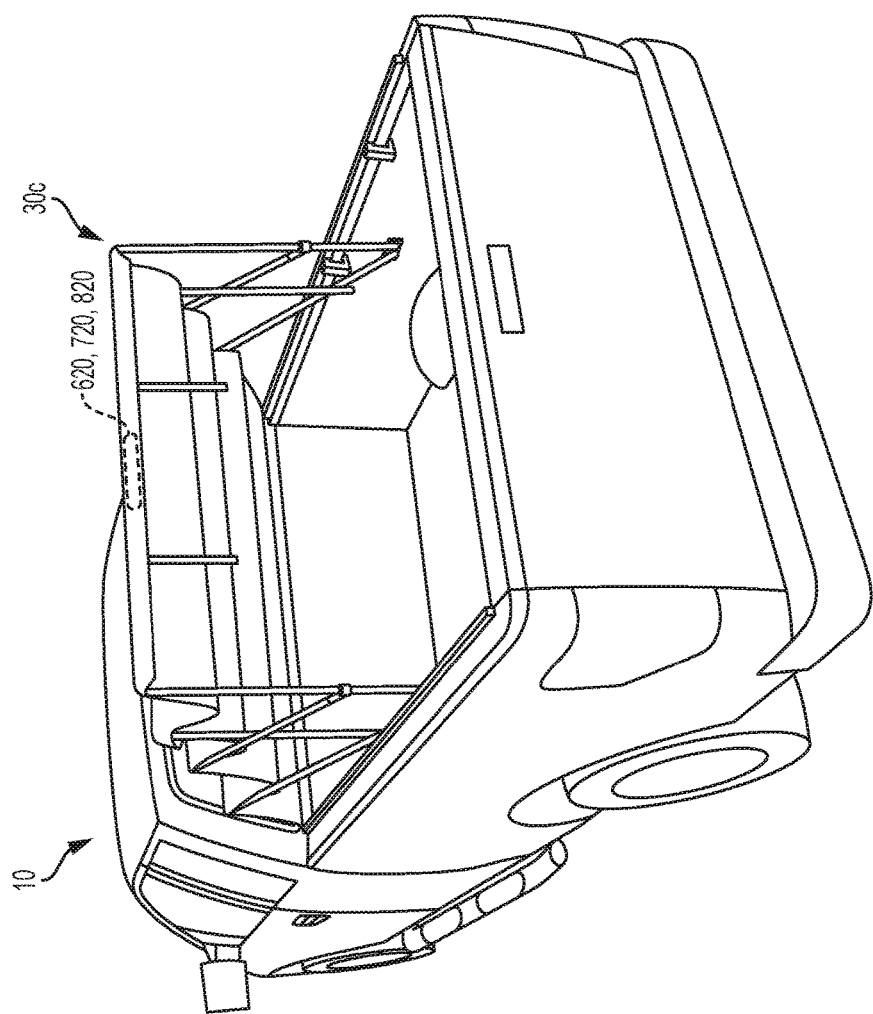
FIG. 2B is a perspective view of the truck with the collapsible camper shell and brake light system of FIG. 2A with the collapsible camper shell in a half-collapsed state.
Figure 2C:
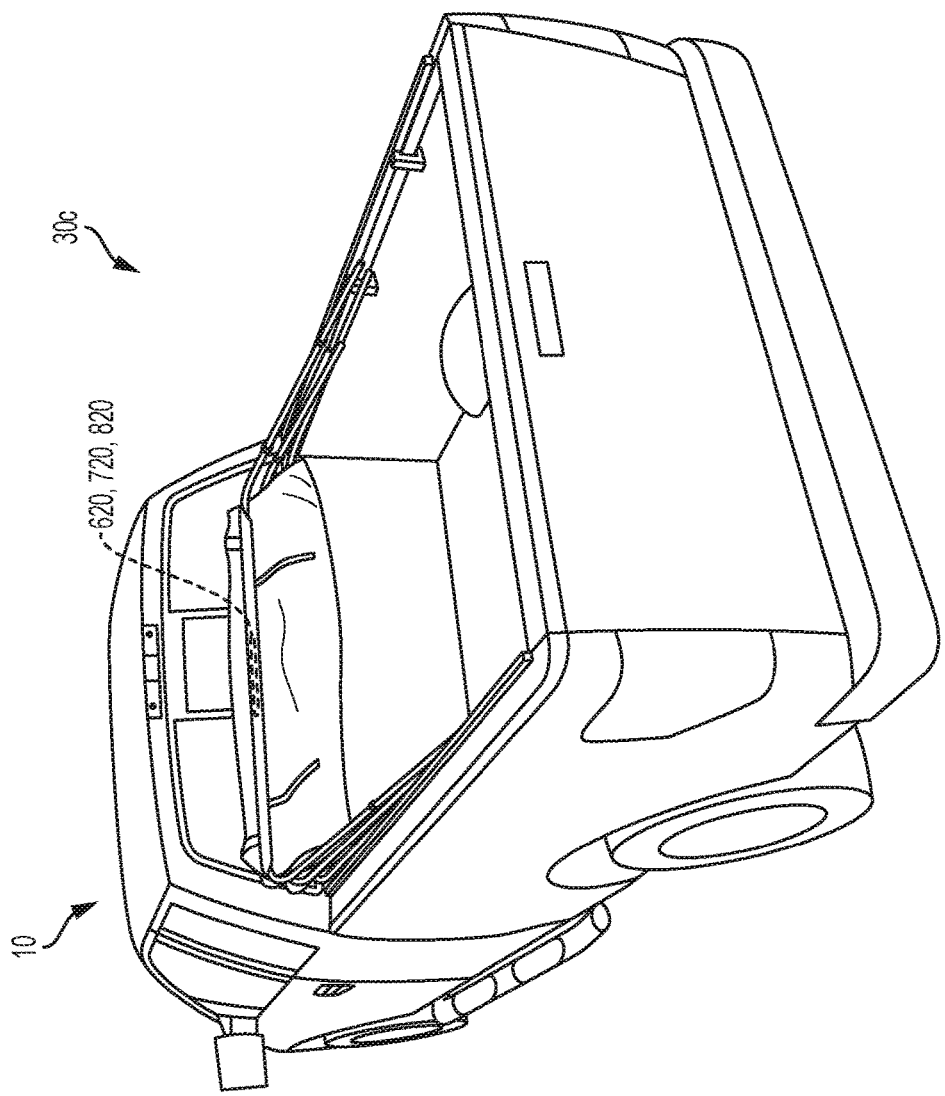
FIG. 2C is a perspective view of the truck with the collapsible camper shell and brake light system of FIG. 2A with the collapsible camper shell in a fully-collapsed state.

In the examples of FIGS. 2A-2C, 6A-6C, 7A-7C, and 8A-8C, an existing camper shell 30, 30c is retrofitted with a brake light system 600, 700, 800 in accordance with the disclosed embodiments. Like the shell bodies 110, 410, 510 described above in relation to FIGS. 1A-1D and 3-5, the camper shell 30, 30c may be a hard body made of a rigid material such as fiberglass, thermoplast, metal (e.g. aluminum), and/or wood, or may be a wholly or partly soft body such as a collapsible (e.g. jointed) metal frame with a flexible material such as fabric (e.g. canvas) or vinyl disposed thereon and may refer to any kind of truck bed accessories that blocks an OEM third brake light 16. An example of a collapsible camper shell 30c is illustrated in FIGS. 2A-2C, 6C, 7C, and 8C. The collapsible camper shell 30c may be, for example, a folding truck cap sold under the tradename Softopper™ such as those truck caps provided by Softopper LLC at softopper.com, which may be collapsed as shown in sequence in FIGS. 2A-2C together with the brake light system 600, 700, 800. In FIGS. 2A-2C, the auxiliary third brake light 620, 720, 820 is shown schematically with the details of the brake light system 600, 700, 800 (e.g. optical waveguide 640, electrical wire 740, wireless receiver 825, etc.) omitted for simplicity. In FIGS. 2B and 2C, the auxiliary third brake light 620, 720, 820 (shown in phantom) may not be visible as the flexible material such as fabric (e.g. canvas) or vinyl of the collapsible camper shell 30c may be folded up over the third brake light 620, 720, 820 and secured by buckles 37c (see FIG. 2A) in preparation for collapsing the collapsible camper shell 30c. Other examples of the collapsible camper shell 30c include the collapsible truck bed cover 10 of U.S. Pat. No. 9,365,097, the collapsible shell 12, 112 of U.S. Pat. No. 9,744,836, and the truck bed accessory frame 10, 210 of U.S. Pat. No. 9,956,857, the entire contents of each of which his expressly incorporated by reference herein.

In the examples of FIGS. 6A-6C and 7A-7C, the optical waveguide 640 or electrical wire 740 may be of a length suitable for use with a camper shell as described herein. For example, the optical waveguide 640 or electrical wire may extend five feet or more from a first end to a second end.

In the examples of FIGS. 7A-7C and 8A-8C, the electronic components of the auxiliary third brake light 720, 820, as well as those associated with the optical sensor 842, wireless transmitter 880, and transmitter battery 890, need not be exposed to the elements and may be provided in an enclosure made of a rigid plastic (e.g. fiberglass), metal (e.g. aluminum), etc. If necessary, antenna elements may be protrude from such enclosures for better signal transmission and reception.

The description of the various aspects of the auxiliary third brake light was discussed in relation to a rigid and/or collapsible enclosure that a truck owner would mount to the bed of his or her truck. The various aspects of the auxiliary third brake light could also be used for cargo boxes that are retrofitted onto a truck frame. Moreover, the various aspects of the auxiliary third brake light are also applicable to any object that may be placed behind the OEM third brake light and that would block the OEM third brake light. For example, if a large or plurality of objects (e.g., boxes, furniture, motorcycle, etc.) were placed in the truck bed so that the OEM third brake light were to be blocked by the object, then the retrofit versions of the auxiliary light could be used to provide a functional third brake light that a vehicle following behind the truck could see when the truck were to stop. Accordingly, although the various aspects of the auxiliary third brake light were discussed in relation to a camper shell, collapsible shell and the like, the various aspects of the auxiliary third brake light can be installed on any object that might block a view of the OEM third brake light.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An enclosure or frame disposable adjacent a bed of a truck, the enclosure or frame comprising:
    a body that fits over the bed of the truck and blocks an original equipment manufacturer (OEM) third brake light located on a cab of the truck, the body having a front portion adjacent to the cab of the truck and a rear portion adjacent to a tailgate of the truck, the body having a recess defining a periphery which circumscribes the original equipment manufacturer third brake light so that the original equipment manufacturer third brake light is disposed within the recess when the enclosure or frame is disposed adjacent the bed of the truck;
    a visible light sensor disposed within the recess of the body and operative to sense visible light emanating from the original equipment manufacturer third brake light;
    an optical or electric signal line in communication with the sensor, the optical or electrical signal line extending from the front portion to the rear portion of the body, the signal line arranged to transmit a signal in response to illumination of the OEM third brake light and sensing of the visible light emanating from the original equipment manufacturer third brake light by the sensor; and
    an auxiliary third brake light disposed at the rear portion of the body and connected to the signal line, the auxiliary third brake light configured to illuminate in response to receiving the signal transmitted by the signal line.

2. The enclosure or frame of claim 1, wherein the signal line is an optical waveguide and the signal transmitted by the signal line is an optical signal.

3. The enclosure or frame of claim 2, wherein the auxiliary third brake light includes an optical sensor arranged to receive the optical signal transmitted by the optical waveguide and the auxiliary third brake light is configured to illuminate in response to the optical sensor receiving the optical signal.

4. The enclosure or frame of claim 2, wherein the auxiliary third brake light includes a light fixture arranged to receive light from the OEM third brake light via the optical waveguide.

5. The enclosure or frame of claim 2, further comprising a lens disposed at the front portion of the body and arranged to focus light from the OEM third brake light into the optical waveguide.

6. The enclosure or frame of claim 5, further comprising a recess formed at the front portion of the body with the lens disposed therein, the recess including one or more reflective surfaces arranged to collect light from the OEM third brake light and direct the collected light toward the lens.

7. The enclosure or frame of claim 1, wherein the signal line is an electrical wire and the enclosure or frame further comprises an optical sensor connected to the electrical wire and disposed at the front portion of the body to receive light from the OEM third brake light.

8. The enclosure or frame of claim 1, further comprising a battery configured to provide power to the auxiliary third brake light.

9. The enclosure or frame of claim 8, further comprising a photovoltaic cell disposed on the body and configured to charge the battery.

10. The enclosure or frame of claim 1, wherein the body comprises a flexible fabric disposed on the frame.

11. The enclosure of claim 1 further comprising a gasket disposed between the periphery of the recess and an exterior surface of the cab of the truck wherein the periphery of the recess pushes against the gasket to block light from entering the recess from a gap between the periphery and the exterior surface of the cab of the truck.

\* \* \* \* \*